US011544508B2

(12) United States Patent
Almazan et al.

(10) Patent No.: US 11,544,508 B2
(45) Date of Patent: Jan. 3, 2023

(54) METHODS, SYSTEMS, ARTICLES OF MANUFACTURE, AND APPARATUS TO RECALIBRATE CONFIDENCES FOR IMAGE CLASSIFICATION

(71) Applicant: Nielsen Consumer LLC, New York, NY (US)

(72) Inventors: Emilio Almazan, Madrid (ES); Aitor Aller Beascoechea, Madrid (ES); Javier Tovar Velasco, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 220 days.

(21) Appl. No.: 17/102,064

(22) Filed: Nov. 23, 2020

(65) Prior Publication Data

US 2022/0164607 A1 May 26, 2022

(51) Int. Cl.
*G06K 9/62* (2022.01)
*G06V 10/22* (2022.01)
(Continued)

(52) U.S. Cl.
CPC ......... *G06K 9/6262* (2013.01); *G06K 9/6256* (2013.01); *G06K 9/6277* (2013.01); *G06N 3/04* (2013.01); *G06N 3/08* (2013.01); *G06V 10/23* (2022.01); *G06V 10/267* (2022.01); *G06V 10/426* (2022.01); *G06Q 10/087* (2013.01)

(58) Field of Classification Search
CPC .. G06K 9/6262; G06K 9/6256; G06K 9/6277; G06V 10/23; G06V 10/267; G06V 10/426; G06N 3/04; G06N 3/08
See application file for complete search history.

(56) References Cited

U.S. PATENT DOCUMENTS 10,474,949 B2 * 11/2019 Majumdar ............. G06N 7/005
10,949,706 B2 * 3/2021 Gupta ................... G06F 16/532
(Continued)

FOREIGN PATENT DOCUMENTS

WO WO-2020251946 A1 * 12/2020 ........... B64C 39/024

OTHER PUBLICATIONS

Wah et al., "The Caltech-UCSD Birds-200-2011 Dataset," Computation & Neural Systems Technical Report, 2011, 8 pages.
(Continued)

*Primary Examiner* — Utpal D Shah
(74) *Attorney, Agent, or Firm* — Hanley, Flight & Zimmerman, LLC

(57) ABSTRACT

Methods, systems, articles of manufacture, and apparatus to recalibrate confidences for image classification are disclosed. An example apparatus to classify an image includes an image crop detector to detect a first image crop from the image, the first image crop corresponding to a first object, a grouping controller to select a second image crop corresponding to a second object at a location of the first object, a prediction generator to, in response to executing a trained model, determine a label corresponding to the first object and a confidence level associated with the label, and a confidence recalibrator to recalibrate the confidence level based on a probability of the first object having a first attribute based on the second object having a second attribute, the confidence level recalibrated to increase an accuracy of the image classification.

21 Claims, 12 Drawing Sheets

(51) Int. Cl.
*G06V 10/26* (2022.01)
*G06V 10/426* (2022.01)
*G06N 3/04* (2006.01)
*G06N 3/08* (2006.01)
*G06Q 10/08* (2012.01)

(56) References Cited

U.S. PATENT DOCUMENTS

| | | | | |
|---|---|---|---|---|
| 11,210,537 | B2* | 12/2021 | Koivisto | G05D 1/00 |
| 2018/0330198 | A1* | 11/2018 | Harary | G06V 10/454 |
| 2020/0250450 | A1* | 8/2020 | Kim | G06V 10/82 |
| 2020/0356813 | A1* | 11/2020 | Sharma | G06Q 30/0641 |
| 2021/0056365 | A1* | 2/2021 | Sivan | G06K 9/6292 |
| 2021/0150282 | A1* | 5/2021 | Chadha | G06T 3/40 |
| 2021/0271923 | A1* | 9/2021 | Yu | G06V 20/46 |
| 2021/0319340 | A1* | 10/2021 | Shabtay | G06N 3/08 |
| 2021/0406288 | A1* | 12/2021 | Wright | G06N 7/005 |
| 2022/0092364 | A1* | 3/2022 | Xu | G06V 10/75 |

OTHER PUBLICATIONS

Sun et al., "Multi-Attention Multi-Class Constraint for Fine-grained Image Recognition," ArXiv.org, 2018, 17 pages.

Chen et al., "Destruction and Construction Learning for Fine-Grained Image Recognition," in proceedings of the IEEE Conference on Computer Vision and Pattern Recognition, pp. 5157-5166, 2019, 10 pages.

Pennington et al., "GloVe: Global Vectors for Word Representation," in proceedings of the 2014 Conference on Empirical Methods in Natural Language Processing (EMNLP), 2014, 12 pages.

Corbiére et al., "Addressing Failure Prediction by Learning Model Confidence," 33rd Conference on Neural Information Processing Systems (NeurIPS 2019), Vancouver, Canada, 12 pages.

Guo et al., "On Calibration of Modern Neural Networks," ArXiv. org, Proceedings of the 34th International Conference on Machine Learning, Sydney, Australia, 2017, 14 pages.

Lee et al., "Context-Aware Emotion Recognition Networks," in proceedings of the IEEE International Conference on Computer Vision, 2019, 10 pages.

Ruder, "An Overview of Multi-Task Learning in Deep Neural Networks," ArXiv.org, 2017, 14 pages.

Kendall et al., "Multi-Task Learning Using Uncertainty to Weigh Losses for Scene Geometry and Semantics," in Conference on Computer Vision and Pattern Recognition, 2018, 14 pages.

Zeiler et al., "Visualizing and Understanding Convolutional Networks," ArXiv.org, 2013, 11 pages.

Rosebrock, "Keras: Multiple Inputs and Mixed Data," pyimagesearch. com, 2019, 66 pages. Retrieved from Internet: https://www.pyimagesearch.com/2019/02/04/keras-multiple-inputs-and-mixed-data/.

Park et al., "Combining Multiple Sources of Knowledge in Deep CNNs for Action Recognition," in proceedings of the IEEE Winter Conference on Applications of Computer Vision (WACV), 2016, 8 pages.

Lin et al., "Bilinear CNNs for Fine-grained Visual Recognition," ArXiv.org, last revised Jun. 1, 2017 14 pages.

Dumoulin et al., "Feature-wise transformations," Distill.com, published Jul. 9, 2018, 22 pages. Retrieved from the Internet: https://distill.pub/2018/feature-wise-transformations/.

Robbins et al., "A Stochastic Approximation Method," The Annals of Mathematical Statistics, vol. 22, No. 3, 1951, pp. 400-407, 8 pages.

Ren et al., "Faster R-CNN: Towards Real-Time Object Detection with Region Proposal Networks," in proceedings of the IEEE Transactions on Pattern Analysis and Machine Intelligence, 2015, 14 pages.

Rumelhart et al., "Learning representations by back-propagating errors," Nature Publishing Group, vol. 323, pp. 533-536, 1986, 4 pages.

\* cited by examiner

METHODS, SYSTEMS, ARTICLES OF MANUFACTURE, AND APPARATUS TO RECALIBRATE CONFIDENCES FOR IMAGE CLASSIFICATION

FIELD OF THE DISCLOSURE

This disclosure relates generally to image classification and, more particularly, to methods, systems, articles of manufacture, and apparatus to recalibrate confidences for image classification.

BACKGROUND

In retail environments, information pertaining to product inventory in a store, product types, and availability can be used to gain a greater understanding of consumer demand and trends. Such information can be gathered from image data. In particular, images taken of product shelves in a retail setting can be analyzed using various techniques to analyze retail, market and/or consumer data.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
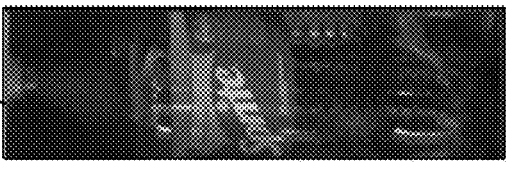
FIG. 1 illustrates example image crops of products from a retail environment that can be analyzed in examples disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In retail environments, information pertaining to an inventory of products in a store can be gathered and utilized to identify information about marketing, product display and/or consumer trends. The information can include a number of the products in the store, types of the products, availability of the products, etc. In some cases, an auditor can visit the store and capture images of store shelves in the store (e.g., using a camera and/or a mobile device). Subsequently, the images can be provided to a computer/computational system for processing, where the processing can entail detecting and classifying products from the images using an artificial intelligence (AI) model (e.g., a machine learning model, a neural network (CNN) model, etc.). In some cases, the AI model can be a convolutional neural network (CNN) model.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a convolutional neural network (CNN) model is used. Using a CNN model enables detection and classification of products from images without a need for human intervention. In general, machine learning models/architectures that are suitable to use in the example approaches disclosed herein will be black box networks in which interconnections are not visible outside of the model. However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labeling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using gradient descent. However, any other training algorithm may additionally or alternatively be used. In examples disclosed herein, training is performed until an acceptable amount of error associated with a cross entropy loss function is achieved. In examples disclosed herein, training is performed remotely at a computer system. Training is performed using hyperparameters that control how the learning is performed (e.g., a learning rate, a number of layers to be used in the machine learning model, etc.).

Training is performed using training data. In examples disclosed herein, the training data originates from images that have been reviewed manually by a human. Because supervised training is used the training data is labeled. Labeling is applied to the training data by the human during manual review of the image data. In some examples, the training data is pre-processed using, for example, an image processor to resize and/or reshape the images. In some examples, the training data is sub-divided into training data and validation data.

Once training is complete, the model is deployed for use as an executable construct that processes an input and provides an output based on the network of nodes and connections defined in the model. The model is stored in a database implemented by any memory, storage device and/or storage disc for storing data such as, for example, flash memory, magnetic media, optical media, solid state memory, hard drive(s), thumb drive(s), etc. The model may then be executed by the example classification controller described in detail below in connection with FIG. 4.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

According to examples disclosed herein, a first CNN model can be trained and executed to detect image crops (e.g., cropped images) corresponding to the products in images obtained in a retail environment. Additionally, a second CNN model can be executed based on the image crops and predictions can be generated corresponding to each of the image crops. Such predictions can include a unique product description and/or attribute, such as a volume of the product corresponding to each of the image crops, for example. Furthermore, the computer system can generate confidence levels associated with each of the predictions, where the confidence levels indicate a likelihood or probability that the corresponding predictions are correct and/or accurate. In some examples, multiple predictions are generated for each of the image crops, where the multiple predictions have varying confidence levels. In such cases, to classify and/or otherwise identify the product in each of the image crops, the computer system can be configured to select the prediction corresponding to the highest confidence level. As such, the computer system can classify and/or otherwise identify each of the products on the store shelves captured in the images.

Advantageously, applying CNN models to classify products from images requires little to no human intervention. As such, automated classification of the images based on the CNN models can generally be executed in less time compared to manual classification in which the images are reviewed by a human reviewer. However, in some cases, challenges associated with the automated classification are related to a large number of unique products to be identified (e.g., over 50,000 in some countries) and/or a potential presence of noise in the training data for the CNN models. Furthermore, the CNN models may not be able to accurately distinguish between products having a similar appearance. For example, two products may be similar in appearance, but differ in an attribute, such as a volume (e.g., a 2.2 liter cola and a 2 liter cola). Typically, such products may be distinguished by a human based on size of the products and/or text of the products indicating the volumes. These attributes may be difficult to read on a camera or image sensor. In particular, size/volume information may not be captured and/or ascertained during the process of obtaining the images. In particular, the images may be captured at irregular distances, such that sizes of the products in the images may vary (e.g., due to varying distances from the products at which the images were captured, due to image and/or lens distortions of product sizes, etc.). Furthermore, the text of the products may not be visible and/or detectable for data accessed by the CNN models due to the products being oriented at irregular angles and/or in response to the images being blurry, for example. As such, the CNN models may not be able to ascertain size or volume information and/or text to distinguish attributes between the products for which images are captured.

Examples disclosed herein recalibrate the confidence levels predicted by the CNN models by integrating contextual information into the predicted confidence levels. For example, examples disclosed herein generate a probability distribution based on co-occurrence of characteristics (e.g., volumes) of products in a shelf. Examples disclosed herein utilize the probability distribution to update the predicted confidence levels based on the probability of each pair of the products being located on the same shelf and/or at a proximate relative positioning thereof. Advantageously, examples disclosed herein improve accuracy of product classifications predicted by the CNN models.

FIG. 1 illustrates example image crops 102, 104, 106, 108 of products from a retail environment that can be analyzed in examples disclosed. In this example, the products have different corresponding volumes. In the illustrated example of FIG. 1, the example first image crop 102 corresponds to a first product (e.g., a first Sprite® beverage product having a volume of 1500 cubic centimeters (cc)), the example second image crop 104 corresponds to a second product (e.g., a second Sprite® beverage product having a volume of 2250 cc), the example third image crop 106 corresponds to a third product (e.g., a first Coca-Cola® beverage product having a volume of 2250 cc), and the example fourth image crop 108 corresponds to a fourth product (e.g., a second Coca-Cola® beverage product having a volume of 3000 cc). In some examples, the image crops 102, 104, 106, 108 are detected from an image utilized by a CNN model. In some examples, the products corresponding to the image crops 102, 104, 106, 108 are located on one or more shelves in a store.

In the illustrated example of FIG. 1, the first product of the first image crop 102 and the second product of the second image crop 104 correspond to a first product type 110 (e.g., Sprite® beverage), and the third product of the third image crop 106 and the fourth product of the fourth image crop 108 correspond to a second product type 112 (e.g., Coca-Cola® beverage). Accordingly, the first product and the second product have similar appearances (e.g., similar shape, color, label design, etc.), but different volumes. Similarly, to differentiate different products of the first and second product types 110, 112, the volumes of the products can be predicted using the CNN model.

The volume information can be predicted based on size of the products and/or text indicating attributes of the products. However, size information can be lost and/or distorted during capturing of the images corresponding to the image crops 102, 104, 106, 108. For example, the second product in the second image crop 104 has a larger volume compared to the first product in the first image crop 102 and, as such, the second product is typically larger in size compared to the first product. However, based on capturing the first image crop 102 and the second image crop 104 at different distances and/or angles from the corresponding products, the first product in the first image crop 102 can inaccurately appear to be the same or similar size as the second product in the second image crop 104. As such, the size of the image crops 102, 104, 106, 108 may not provide accurate information about the sizes and/or volumes of the corresponding products. Additionally, the text on product labels indicating the volumes of the corresponding products may not be visible, legible and/or detectable by the CNN model. For example, the text may be less visible or discernible when rotated away from a camera capturing the image crops 102, 104, 106, 108. As such, the CNN model may be unable to accurately classify the products based on individual ones of the image crops 102, 104, 106, 108.

Figure 2:
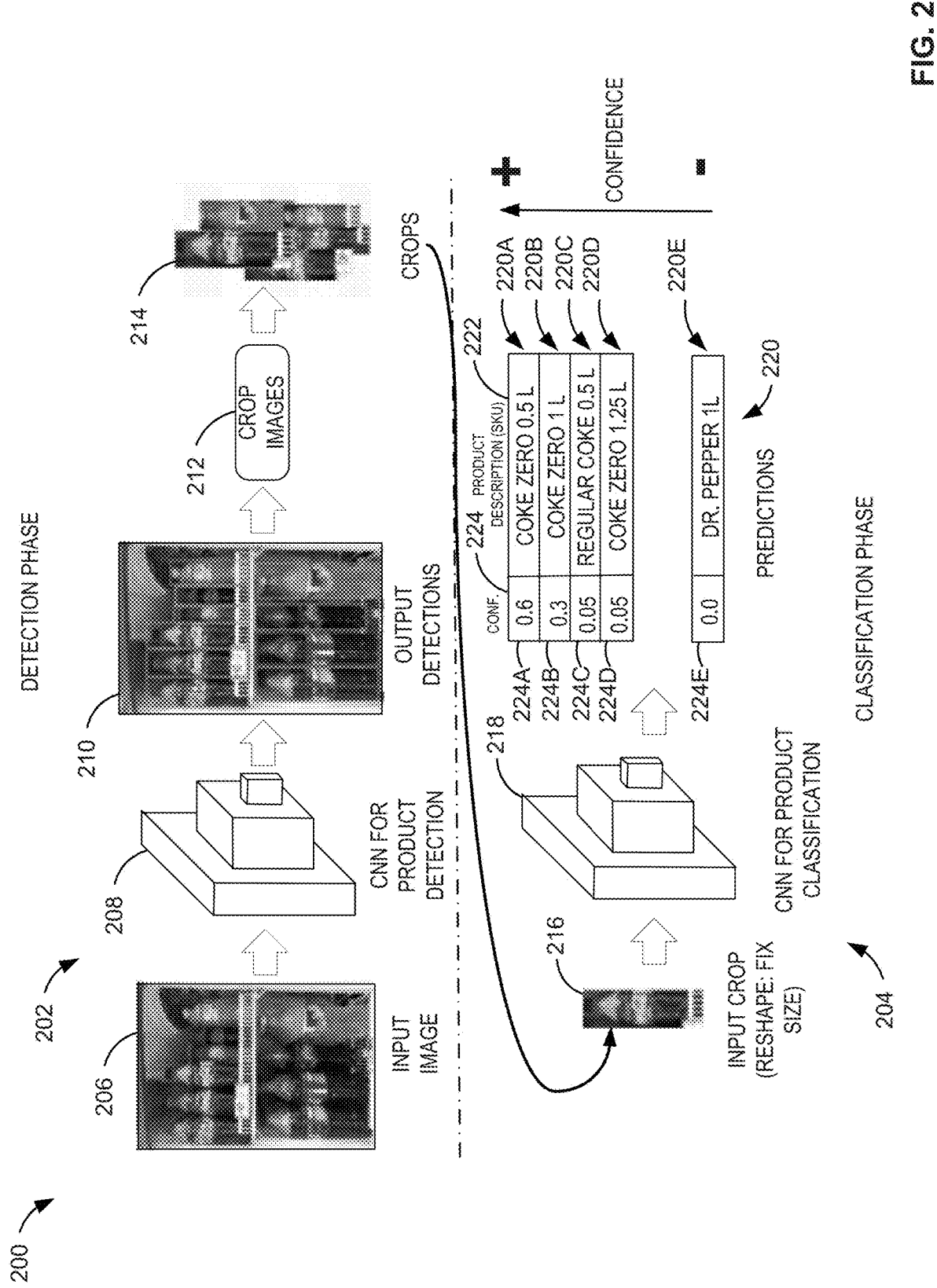
FIG. 2 illustrates an example detection and classification methodology for which examples disclosed herein can be implemented.

FIG. 2 illustrates an example detection and classification methodology 200 for which examples disclosed herein can be implemented. The detection and classification methodology 200 includes an example detection phase 202 and an example classification phase 204. The example detection phase 202 includes an example input image 206, an example product detection CNN model (e.g., first CNN model) 208, example output detections 210, an example image cropper 212, and example image crops 214. Furthermore, the example classification phase 204 includes an example query image crop (e.g., processed image crop) 216, an example product classification CNN model (e.g., second CNN model) 218, and example query predictions 220 (hereinafter 220A, 220B, 220C, 220D, etc.) with query product descriptions 222 and query confidence levels 224 (hereinafter 224A, 224B, 224C, 224D, etc.).

In the illustrated example of FIG. 2, the detection and classification methodology 200 is initiated and/or performed at the detection phase 202. In the example detection phase 202, the input image 206 corresponds to shelves displayed in a store with multiple products positioned on each of the shelves and is provided to the product detection CNN model 208. In this example, the input image 206 includes a first shelf and a second shelf on which multiple beverage products are displayed, and the multiple beverage products vary by size, shape, and/or brand. In some examples, the input image 206 can be captured by an auditor and/or a customer of the store using a camera (e.g., on a mobile device).

In response to receiving the input image 206 as an input, the product detection CNN model 208 detects image portions of the input image 206 corresponding to ones of the products captured in the input image 206. In the illustrated example of FIG. 2, the product detection CNN model 208 is a trained model. For example, the product detection CNN model 208 is trained based on labeled data to identify image portions that may represent a product. In response to detecting the image portions of the input image 206, the product detection CNN model 208 outputs the output detections 210. For example, the product detection CNN model 208 receives the input image 206 and predicts bounding boxes on the input image 206 that may contain products. In some examples, the product detection CNN model 208 outputs coordinates corresponding to each of the bounding boxes relative to the input image 206.

In the illustrated example of FIG. 2, the output detections 210 are provided to the image cropper 212. In turn, the image cropper 212 crops each of the detected image portions identified in the output detections 210 from the input image 206 to generate the image crops 214. Accordingly, each of the image crops 214 corresponds to a unique product captured in the input image 206. In some examples, the image crops 214 correspond to the beverage products on the first shelf and/or the second shelf of the store. In some examples, the image crops 214 can be used as an input for the classification phase 204 of the detection and classification methodology 200.

The example classification phase 204 is associated with processing the image crops 214 generated during the detection phase 202 to generate the query image crop 216. For example, one of the image crops 214 is resized and/or reshaped during the classification phase 204 to generate the corresponding query image crop 216. In some examples, each of the image crops 214 is processed prior to execution of the product classification CNN model 218. In some examples, processing of the image crops 214 can improve accuracy and/or speed of classification by the product classification CNN model 218. However, size information corresponding to each of the products in the image crops 214 can be lost during reshaping of the image crops 214 and/or during capturing of the input image 206.

In the illustrated example of FIG. 2, the query image crop 216 is provided (e.g., as an input) to the product classification CNN model 218. Further, upon execution, the product classification CNN model 218 generates the query predictions 220 corresponding to the query image crop 216. For example, the query predictions 220 include the query product descriptions 222 identifying the product captured in the query image crop 216. In some examples, the query predictions 220 can identify one or more possible products that correspond to the query image crop 216. In this example, the first query prediction 220A indicates that the product in the query image crop 216 is a Coke Zero® with a volume of 0.5 liters (L), the second query prediction 220B indicates that the product is a Coke Zero® with a volume of 1 L, the third query prediction 220C indicates that the product is an original flavor Coke® with a volume of 0.5 L, etc. In some examples, a number of the query predictions 220 corresponds to a total number of products supported by the product classification CNN model 218. In some such examples, the total number of products supported by the product classification CNN model 218 can be greater than 50,000.

In the illustrated example of FIG. 2, the query predictions 220 include the query confidence levels 224 corresponding to each of the query product descriptions 222. In this example, the query confidence levels 224 indicate a likelihood (e.g., a confidence) that the corresponding predicted query product descriptions 222 are accurate and/or correct. In the illustrated example, the first query prediction 220A corresponds to an example first query confidence level 224A of 0.6 (e.g., 60% confidence). As such, the product in the query image crop 216 is 60% likely to be a Coke Zero® with a volume of 0.5 L. In the illustrated example of FIG. 2, remaining ones of the query confidence levels 224 (e.g., an example second query confidence level 224B, an example third query confidence level 224C, an example fourth query confidence level 224D, and an example fifth query confidence level 224E) are lower than the first query confidence level 224A. In some examples, a prediction corresponding to the highest confidence level (e.g., the first query prediction 220A) is selected to be a correct prediction with respect to the query image crop 216. In some examples, the product classification CNN model 218 can output a predetermined number of the query predictions 220 (e.g., a top five of the query predictions 220 corresponding to the highest query confidence levels 224).

In the illustrated example of FIG. 2, the query predictions 220 generated by the product classification CNN model 218 are based primarily on the input provided by the query image crop 216. For example, the product classification CNN model 218 does not apply contextual information from remaining ones of the image crops 214 during generation of the query predictions 220. The contextual information can include a probability that a product in the query image crop 216 has a first volume in response to a neighboring product (e.g., located on the same shelf as the query product) having a second volume. In some examples, the probability can be obtained from a probability distribution represented by a volume co-occurrence graph. According to examples disclosed herein, the contextual information (e.g., the volume co-occurrence graph) can be used to update and/or recalibrate the query confidence levels 224 generated by the product classification CNN model 218.

Figure 3:
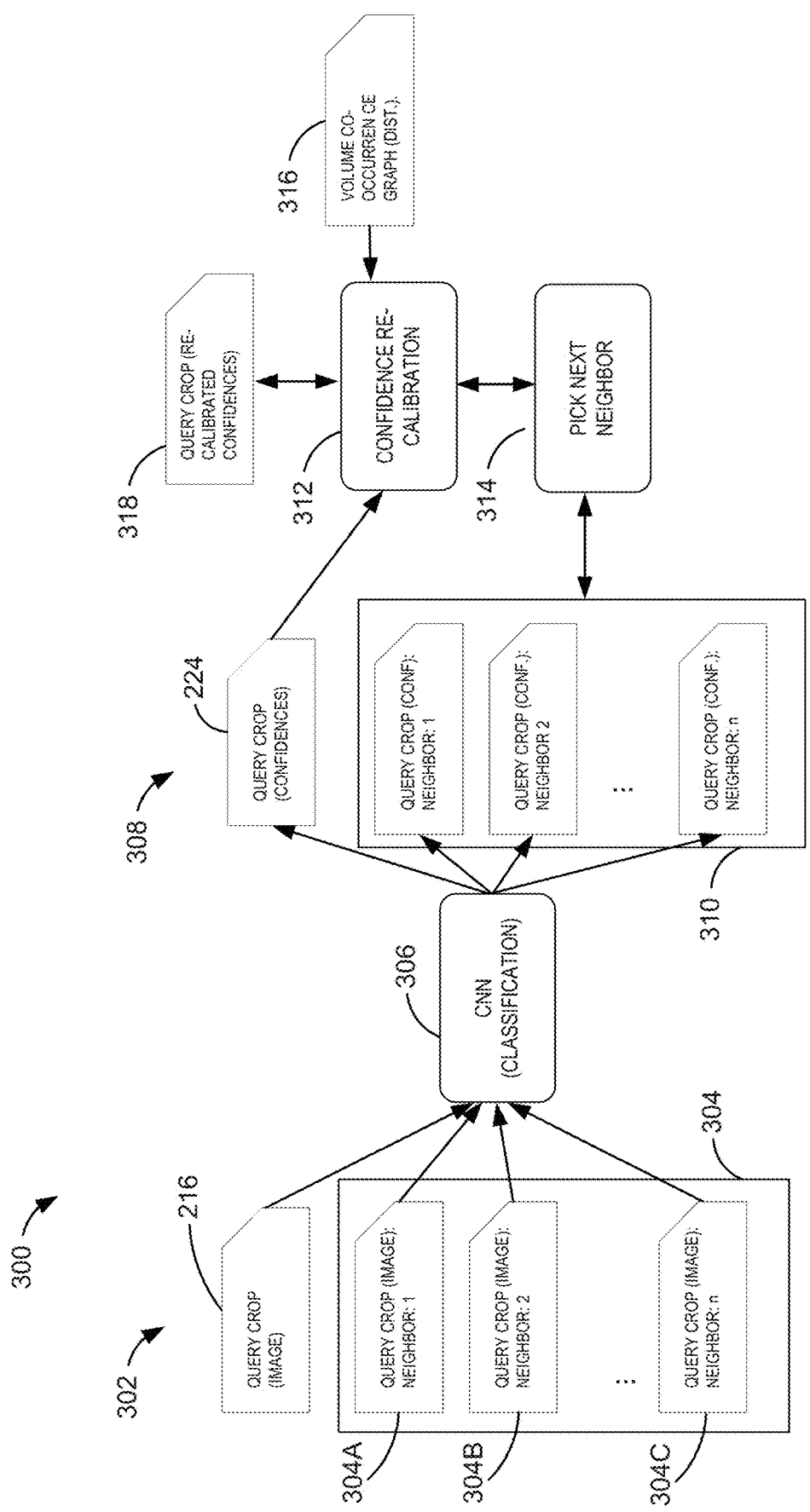
FIG. 3 illustrates an example confidence generation and recalibration process flow in accordance with teachings of this disclosure.

FIG. 3 illustrates an example confidence generation and recalibration process flow 300 in accordance with teachings of this disclosure. In the illustrated example of FIG. 3, the confidence generation and recalibration process flow 300 is used to generate and/or recalibrate the query confidence levels 224 of FIG. 2. In the illustrated example of FIG. 3, the example confidence generation and recalibration process flow 300 includes examples inputs 302 which, in turn, include the example query image crop 216 of FIG. 2 and example neighbor image crops 304. The example confidence generation and recalibration process flow 300 also includes an example classification 306, example outputs 308 including the aforementioned example query confidence levels 224 and example neighbor confidence levels 310, an example confidence recalibration 312, an example neighbor selection 314, and example volume co-occurrence distribution graph 316, and example recalibrated query confidence levels 318.

In the illustrated example of FIG. 3, the query image crop 216 and the neighbor image crops 304 are provided as inputs to the classification 306. In this example, at the classification 306, the product classification CNN model 218 of FIG. 2 is executed based on the inputs 302 (e.g., the query image crop 216 and the neighbor image crops 304) to generate the outputs 308 (e.g., the query confidence levels 224 and the neighbor confidence levels 310). In this example, the neighbor image crops 304 correspond to neighbor products located on the same shelf as a query product in the query image crop 216. For example, the neighbor image crops 304 are identified in the output detections 210 of FIG. 2 along with the query image crop 216. In some examples, the neighbor image crops 304 are selected based on the locations of the neighbor image crops 304 with respect to the query image crop 216 in the input image 206 of FIG. 2. For example, the neighbor image crops 304 are selected in response to each of the neighbor image crops 304 being substantially at the same vertical position of the input image 206 as the query image crop 216. In some examples, the neighbor image crops 304 correspond to n neighbors, where n is a number of the neighbor products on the same shelf as the query product corresponding to the query image crop 216. In some examples, the neighbor image crops 304 include an example first neighbor image crop 304A, an example second neighbor image crop 304B, and up to an example $n^{thy}$ neighbor image crop 304C.

In the illustrated example of FIG. 3, the outputs 308 are output by the classification 306 in response to execution of the product classification CNN model 218. In the illustrated example, the query confidence levels 224 correspond to the query image crop 216, and the neighbor confidence levels 310 correspond to the neighbor image crops 304. In some examples, the neighbor confidence levels 310 correspond to possible product descriptions of the neighbor products. In some examples, the possible product descriptions for the neighbor image crops 304 are the same as the query product descriptions 222 of FIG. 2. Furthermore, each of the possible product descriptions can include a product volume corresponding to the respective neighbor product. In some examples, the neighbor confidence levels 310 represent confidences that the corresponding product descriptions for each of the neighbor image crops 304 are correct and/or accurate.

In the illustrated example of FIG. 3, the confidence recalibration 312 utilizes the outputs 308 of the classification 306 to recalibrate the query confidence levels 224. For example, at the confidence recalibration 312, the query confidence levels 224 are recalibrated based on the neighbor confidence levels 310 and the volume co-occurrence distribution graph 316. In some examples, at the neighbor selection 314, the neighbor confidence levels 310 corresponding to each of the neighbor products are selected and used to iteratively and/or reiteratively update the query confidence levels 224 to generate the corresponding recalibrated query confidence levels 318. Additionally, using the volume co-occurrence distribution graph 316, the query confidence levels 224 are updated based on probabilities that first volumes corresponding to the query product and second volumes corresponding to each of the neighbor products appear on the same shelf. Advantageously, the recalibrated query confidence levels 318 generated at the confidence recalibration 312 are more accurate compared to the query confidence levels 224. Recalibration of the query confidence levels 224 is further described below in connection with FIG. 4.

Figure 4:
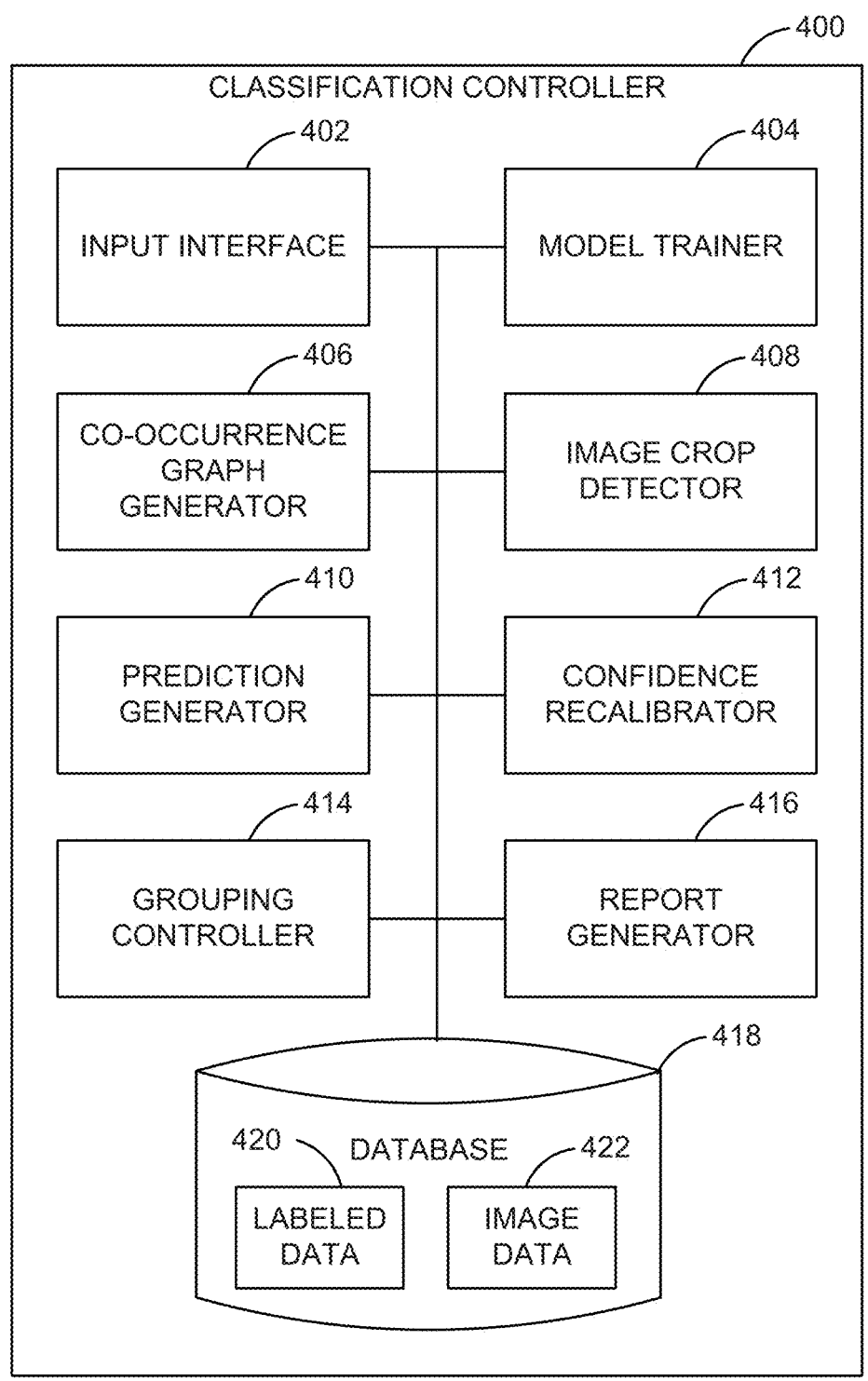
FIG. 4 is a block diagram of an example classification controller in accordance with teachings of this disclosure.

FIG. 4 is a block diagram of an example classification controller 400 in accordance with teachings of this disclosure. The example classification controller 400 is implemented to generate and/or recalibrate the query confidence levels 224 that are generated by the classification phase 204 of FIG. 2. In some other examples, the example classification controller 400 is implemented during the classification phase 204. In the illustrated example of FIG. 4, the classification controller 400 includes an example input interface 402, an example model trainer 404, an example co-occurrence graph generator 406, an example image crop detector 408, an example prediction generator 410, an example confidence recalibrator 412, an example grouping controller 414, an example report generator 416, and an example database 418 which, in turn, includes and/or stores example labeled data 420 and example image data 422.

The example input interface 402 receives commands and/or data from a user. In some examples, the input interface 402 is communicatively coupled to a computing device (e.g., a personal computing device, a remote computer system) and/or a network (e.g., via a network interface). For example, the input interface 402 can receive the labeled data 420 and/or the image data 422 from the computing device and/or from a mobile device operated by the user. In some examples, the input interface 402 can receive one or more commands from the user via the computing device. In some examples, in response to the image data 422 including an image (e.g., the input image 206 of FIG. 2), the one or more commands can include directing the classification controller 400 to detect image crops (e.g., the image crops 214 of FIG. 2) from the input image 206. Additionally or alternatively, in response to the image data 422 including the image crops 214, the one or more commands can include directing the classification controller 400 to execute the confidence generation and recalibration process flow 300 of FIG. 3 based on the image crops 214. In some examples, the input interface 402 can transmit and/or provide the labeled data 420 and/or the image data 422 to be stored in the database 418.

The model trainer 404 generates and/or trains one or more CNN models (e.g., the product detection CNN model 208 and/or the product classification CNN model 218 of FIG. 2). For example, the model trainer 404 can train the one or more CNN models using the labeled data 420 stored in the database 418. In examples disclosed herein, the labeled data 420 refers to data that has been manually reviewed by a human reviewer. For example, the labeled data 420 can include labeled image crops, where labels identifying the products in the labeled image crops are assigned by the human reviewer. During training, model parameters of the one or more CNN models are iteratively updated based on the labeled data 420 until an error value associated with the one or more CNN models satisfies a threshold. In particular, the error value can be calculated based on a cross entropy loss function.

In some examples, a first portion of the labeled data 420 is utilized for training the one or more CNN models, and a second portion of the labeled data 420 is used for validating the one or more CNN models. For example, the model trainer 404 can train the one or more CNN models using the first portion of the labeled data 420, and can execute the one or more trained CNN models using the second portion of the labeled data 420 to output predicted labels. In such examples, the model trainer 404 compares the predicted labels to known labels associated with the second portion of the labeled data 420. In some examples, the model trainer 404 determines a proportion (e.g., percentage) of the predicted labels that are correct and/or accurate (e.g., a proportion of the predicted labels matching corresponding ones of the known labels). In response to the proportion of the predicted labels satisfying a validation threshold (e.g., 90% correct, 95% correct), the model trainer 404 validates and/or selects the one or more trained CNN models for use by the classification controller 400. Alternatively, in some examples, the model trainer 404 can retrain the one or more CNN models in response to the proportion of the predicted labels not satisfying the validation threshold. In some examples, in response to the model trainer 404 training and/or validating the product detection CNN model 208 and the product classification CNN model 218, the model trainer 404 deploys the product detection CNN model 208 for use by the image crop detector 408, and deploys the product classification CNN model 218 for use by the prediction generator 410.

The co-occurrence graph generator 406 of the illustrated example generates one or more volume co-occurrence graphs based on the labeled data 420. For example, the co-occurrence graph generator 406 generates a volume co-occurrence cardinality graph based on the number of co-occurrences of volumes per shelf. In some examples, the co-occurrence graph generator 406 generates the volume co-occurrence distribution graph 316 of FIG. 3 by normalizing the volume co-occurrence cardinality graph.

Figure 5A:
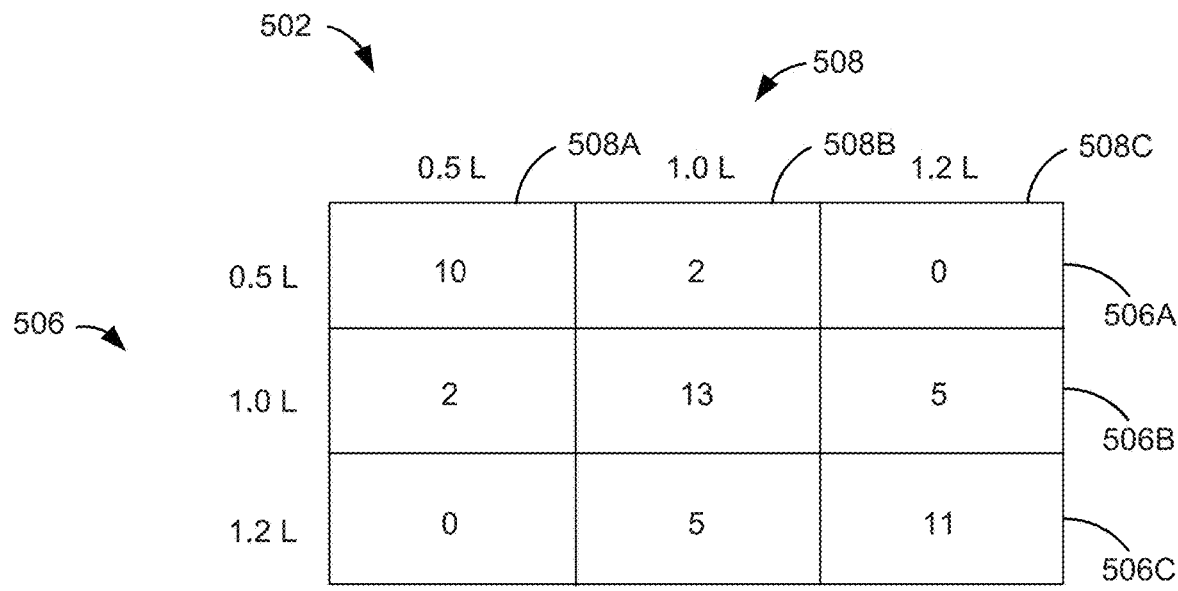
FIG. 5A illustrates an example volume co-occurrence cardinality graph that can be implemented in examples disclosed herein.
Figure 5B:
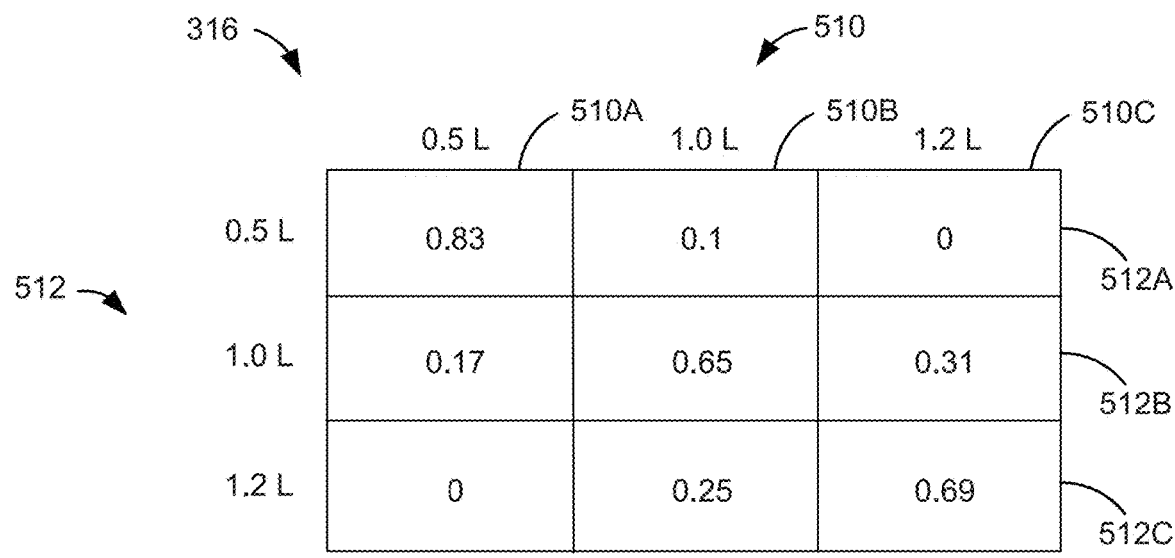
FIG. 5B illustrates an example volume co-occurrence distribution graph that can be implemented in examples disclosed herein.

FIGS. 5A and 5B illustrate an example volume co-occurrence cardinality graph (e.g., cardinality graph) 502 and the example volume co-occurrence distribution graph (e.g., distribution graph) 316 of FIG. 3, respectively, that can be implemented in examples disclosed herein. In the illustrated example of FIG. 5A, the cardinality graph 502 is a square matrix of size N-by-N, where N corresponds to a number of unique volumes represented in the labeled data 420. For example, the cardinality graph 502 of FIG. 5A corresponds to N=3, where each of the products captured by the labeled data 420 corresponds to one of three unique volumes (e.g., 0.5 L, 1.0 L, or 1.2 L). The cardinality graph 502 includes example rows 506 including an example first row 506A corresponding to 0.5 L, an example second row 506B corresponding to 1.0 L, and an example third row 506C corresponding to 1.2 L. Furthermore, the cardinality graph 502 includes example columns 508 including an example first column 508A corresponding to 0.5 L, an example second column 508B corresponding to 1.0 L, and an example third column 508C corresponding to 1.2 L.

In the illustrated example of FIG. 5A, each value (e.g., $V_{ij}$) in the cardinality graph 502 represents a number of instances that a first volume (e.g., corresponding to an $i^{th}$ column) and a second volume (e.g., corresponding to a $j^{th}$ row) occur together in the same shelf based on the labeled data 420. For example, according to the first column 508A and the second row 506B of the cardinality graph 502, the first volume of 0.5 L and the second volume of 1.0 L co-occur 2 times. In particular, in the labeled images of the labeled data 420, there are 2 instances in which a first product having the first volume of 0.5 L and a second product having the second volume of 1.0 L appear on the same shelf. Similarly, the cardinality graph 502 displays the number of co-occurrences for each respective pair of volumes.

In the illustrated example of FIG. 5B, the distribution graph 316 corresponding to the cardinality graph 502 of FIG. 5A can be generated by normalizing the values in the cardinality graph 502. For example, normalized values in an example first column 510A of the distribution graph 316 are generated by determining a sum of the values from the first column 508A of the cardinality graph 502, then dividing each of the values from the first column 508A of the cardinality graph 502 by the sum. The normalized values for an example second column 510B and an example third column 510C of the distribution graph 316 can similarly be determined based on the second column 508B and the third column 508C of the cardinality graph 502, respectively. The normalized values in the distribution graph 316 represent a probability of the first volume occurring in a shelf given the second volume occurring in the shelf. For example, according to the first column 510A and an example second row 512B of the distribution graph 316, a probability of co-occurrence of the first volume of 0.5 L occurring in the shelf given that the second volume of 1.0 L occurs in the shelf is approximately 0.17 (e.g., 17%). In particular, in the labeled images of the labeled data 420, a first product having the first volume of 0.5 L appears in 17% of the labeled images containing a second product having the second volume of 1.0 L. Similarly, the distribution graph 316 displays the probability of co-occurrence for each respective pair of volumes.

Returning to FIG. 4, the co-occurrence graph generator 406 can generate the cardinality graph 502 and the distribution graph 316 of FIGS. 5A and 5B, respectively. For example, the co-occurrence graph generator 406 generates the cardinality graph 502 by counting the number of co-occurrence for each volume pair in the labeled data 420. Further, the co-occurrence graph generator 406 generates the distribution graph 316 by normalizing the values in the cardinality graph 502. Additionally or alternatively, the co-occurrence graph generator 406 can generate a co-occurrence graph based on at least one different characteristic of the products instead of the volumes. For example, the co-occurrence graph can be based on co-occurrences of color, shape, weight, brand, etc. for products on the same shelf or in the same area. In some examples, the co-occurrence graph generator 406 provides the cardinality graph 502 and/or the distribution graph 316 to the confidence recalibrator 412. In some examples, the co-occurrence graph generator 406 updates the cardinality graph 502 and/or the distribution graph 316 in response to the input interface 402 receiving new, updated and/or additional data to include in the labeled data 420.

The example image crop detector 408 can detect and/or generate the image crops 214 from the input image 206 of FIG. 2. For example, the image crop detector 408 can execute the product detection CNN model 208 using the input image 206 to output the output detections 210 of FIG. 2. In some examples, the output detections 210 correspond to products (e.g., beverage products) detected in the input image 206. In some examples, the image crop detector 408 can include the image cropper 212 of FIG. 2. In such examples, the image cropper 212 can generate the image crops 214 by cropping the output detections 210 from the input image 206 and generate separate image files corresponding to the image crops 214. Additionally or alternatively, the image crop detector 408 can process the image crops 214. For example, in response to generating the image crops 214, the image crop detector 408 can reshape and/or resize the image crops 214. In some such examples, the image crops 214 are resized to the same pixel dimensions to allow execution of the product classification CNN model 218. In some examples, the image crop detector 408 provides the image crops 214 to the prediction generator 410 and/or to the database 418 to be stored as the image data 422.

The prediction generator 410 generates predictions (e.g., the query predictions 220 of FIG. 2) corresponding to each of the image crops 214. For example, in response to the image crop detector 408 processing one of the image crops 214 to generate the query image crop 216, the prediction generator 410 executes the product classification CNN model 218 using the query image crop 216. In response to executing the product classification CNN model 218, the prediction generator 410 generates the query product descriptions 222 and the corresponding query confidence levels 224 for the query image crop 216. In this example, the prediction generator 410 reorders the query predictions 220 from highest confidence to lower and/or lowest confidence based on the query confidence levels 224, and selects a prediction having a relatively high confidence level (e.g., the maximum confidence level) as an accurate classification for the product in the query image crop 216.

In the illustrated example of FIG. 4, the prediction generator 410 further generates neighbor predictions corresponding to each of the neighbor image crops 304 of FIG. 3. For example, the prediction generator 410 generates the neighbor predictions by executing the product classification CNN model 218 using each of the neighbor image crops 304. In such examples, each of the neighbor predictions further include neighbor product descriptions and the neighbor confidence levels 310 of FIG. 3. In some examples, the prediction generator 410 provides the neighbor predictions and the query predictions 220 to the confidence recalibrator 412 for recalibration and/or to the database 418 for storage.

The confidence recalibrator 412 recalibrates the query confidence levels 224 generated by the prediction generator 410 to generate the recalibrated query confidence levels 318 shown in FIG. 3. For example, the confidence recalibrator 412 recalibrates the query confidence levels 224 based on the volume co-occurrence distribution graph 316 and the neighbor predictions corresponding to each of the neighbor image crops 304. In the illustrated example of FIG. 4, the confidence recalibrator 412 determines each of the recalibrated query confidence levels 318 based on Equation 1 below.

$$\hat{S}_i^m = \frac{1}{N}\frac{1}{K}\sum_{n \in N}\sum_{j=1}^{K} \log p(v_i^m | v_j^n) p(c_j^n) p(c_i^m) \qquad \text{Equation 1}$$

In the above Equation 1, $\hat{S}_i^m$ represents one of the recalibrated query confidence levels 318 corresponding to query crop m, where the query crop m represents the query image crop 216. In some examples, the query crop m can correspond to a different one of the image crops 214. Furthermore, $\hat{S}_i^m$ refers to an $i^{th}$ position (e.g., rank) of the recalibrated query confidence levels 318. For example, in response to the rank i being equal to 1, $\hat{S}_i^m$ is a recalibrated value for the first query confidence level 224A of FIG. 2. Additionally, in Equation 1 above, n refers to a current neighbor crop of the neighbor image crops 304, and N represents the total number of the neighbor image crops 304. K represents the total number of product types (e.g., total number of the query product descriptions 222 of FIG. 2) supported by the product classification CNN model 218.

In the above Equation 1, $p(c_i^m)$ represents a confidence corresponding to the $i^{th}$ position for the query crop m. For example, in response to the rank i being equal to 1, $p(c_i^m)$ corresponds to the first query confidence level 224A (e.g., 0.6). Furthermore, $p(c_j^n)$ represents a confidence corresponding to the $j^{th}$ position of the neighbor confidence levels 310 for the current neighbor crop n. In Equation 1, $p(v_i^m|v_j^n)$ represents a conditional probability of the first volume $v_i^m$ given the second volume $v_j^n$. In some examples, the confidence recalibrator 412 determines the conditional probability based on the distribution graph 316. In one example, in response to the first volume $n_i^m$ being 0.5 L and the second volume $v_j^n$ being 0.5 L, the confidence recalibrator 412 determines that the conditional probability is 0.83 based on the distribution graph 316.

The example confidence recalibrator 412 generates the recalibrated query confidence levels 318 based on Equation 1. For example, the confidence recalibrator 412 determines a logarithm of a product of the conditional probability $p(v_i^m|v_j^n)$, the confidence $p(c_i^m)$ corresponding to the $i^{th}$ position for the query crop m, and the confidence $p(c_i^m)$ for each $j^{th}$ position of the current neighbor crop n. Furthermore, the confidence recalibrator 412 determines a first sum based on the logarithms of the products across all $j^{th}$ positions for the current neighbor crop n. In this example, the confidence recalibrator 412 further determines a second sum based on the first sums for each of the neighbor image crops 304. The confidence recalibrator 412 can generate the recalibrated value $\hat{S}_i^m$ by dividing the second sum by the total number of neighbors N and the total number of product types supported K. In some examples, the confidence recalibrator 412 can generate the recalibrate query confidence levels 224 for one or more different query crops (e.g., m) and/or one or more different ranks (e.g., i).

The example grouping controller 414 groups the image crops 214 based on shelf location and/or volume. For example, the grouping controller 414 can select the neighbor image crops 304 based on locations of the neighbor image crops 304 with respect to the query image crop 216 in the input image 206. For example, the grouping controller 414 selects the neighbor image crops 304 corresponding to ones of the image crops 214 having the same vertical position (e.g., the same shelf location) in the input image 206 as the query image crop 216. In some examples, the grouping controller 414 labels each of the image crops 214 based on the corresponding shelf location, where a first label corresponds to a first shelf, a second label corresponds to a second shelf, etc. In some examples, the grouping controller 414 stores labeled ones of the image crops 214 as image data 422 in the database 418. Additionally or alternatively, the grouping controller 414 can group labeled image crops from the labeled data 420 based on the corresponding shelf locations, where the labels are assigned by a human reviewer instead of the grouping controller 414. In some examples, additionally or alternatively, the grouping controller 414 can group the labeled image crops from the labeled data 420 based on volumes of the corresponding products in the labeled image crops.

In one example, the grouping controller 414 determines a first group of the image crops 214 corresponding to products on a first shelf of the input image 206, and determines a second group of the image crops 214 corresponding to products on a second shelf of the input image 206. Furthermore, the grouping controller 414 can determine a first subgroup of the first group corresponding to products on the first shelf with a volume of 0.5 L, a second subgroup of the first group corresponding to products on the first shelf with a volume of 1.0 L, and a third subgroup of the first group corresponding to products on the first shelf with a volume of 1.2 L. In some examples, the grouping controller 414 can provide each of the groups and the subgroups of the image crops 214 to the co-occurrence graph generator 406 for generating the cardinality graph 502 and/or the distribution graph 316.

The report generator 416 of the illustrated example generates and/or sends one or more reports to a user. In particular, the report generator 416 can generate a report including the recalibrated query confidence levels 318 generated by the confidence recalibrator 412. In some examples, the report can further include the query product descriptions 222, the query confidence levels 224, and/or otherwise the query predictions 220 of FIG. 2. In some examples, the report generator 416 can send the report to a computing device communicatively coupled to the classification controller 400 and/or operated by the user. In some examples, the report generator 416 can be configured to send the report periodically and/or in response to a command from the user. Additionally or alternatively, the report generator 416 can store the report in the database 418.

In this example, the database 418 stores data (e.g., the labeled data 420 and the image data 422) utilized and/or generated by the classification controller 400. The example database 418 of FIG. 4 is implemented by any memory, storage device and/or storage disc for storing data such as, for example, flash memory, magnetic media, optical media, solid state memory, hard drive(s), thumb drive(s), etc. Furthermore, the data stored in the example database 418 may be in any data format such as, for example, binary data, comma delimited data, tab delimited data, structured query language (SQL) structures, etc. While, in the illustrated example, the example database 418 is illustrated as a single device, the example database 418 and/or any other data storage devices described herein may be implemented by any number and/or type(s) of memories.

Figure 6:
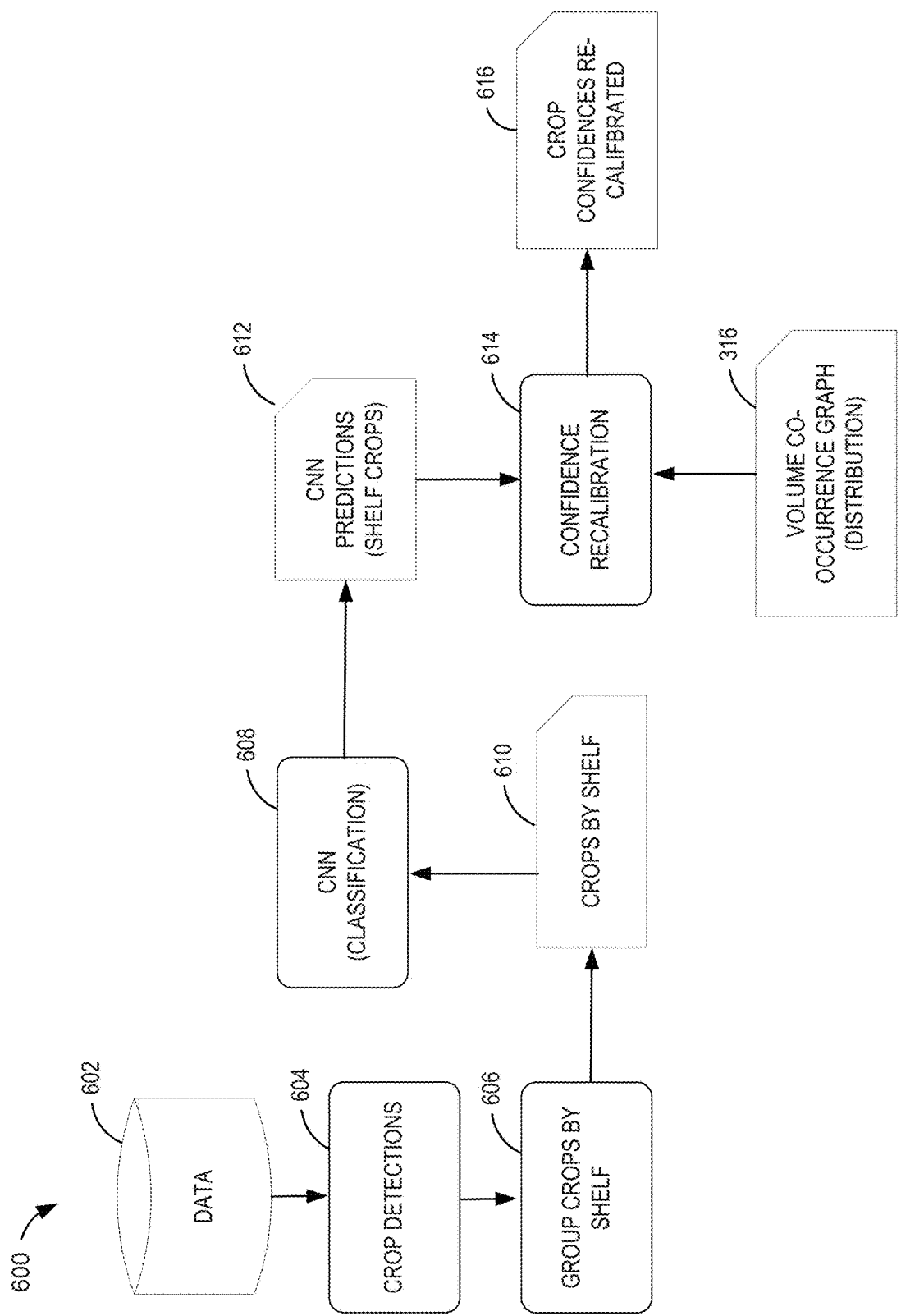
FIG. 6 is a block diagram of an example process flow that can be implemented in examples disclosed herein.

Turning to FIG. 6, a block diagram of an example process flow 600 that can be implemented in examples disclosed herein is shown. The example process flow 600 can be executed by the classification controller 400 of FIG. 4 to detect and/or classify an image (e.g., the input image 206 of FIG. 2). In the illustrated example of FIG. 6, example data 602 is provided to example crop detections 604. For example, the data 602 can be provided via the input interface 402 of FIG. 4. In some examples, the data 602 can include the input image 206. At the crop detections 604, the image crop detector 408 of FIG. 4 detects and crops the image crops 214 from the input image 206 by executing the product detection CNN model 208 of FIG. 2. In some examples, the product detection CNN model 208 is generated, trained, and/or validated by the model trainer 404 of FIG. 4 prior to execution of the product detection CNN model 208 by the image crop detector 408. In response to the image crops 214 being detected, for example group crops by shelf 606, the grouping controller 414 of FIG. 4 groups the image crops 214 based on shelf location of products corresponding to the image crops 214. For example, the grouping controller 414 groups the query image crop 216 and the neighbor image crops 304 in response to determining that the products corresponding to the query image crop 216 and the neighbor image crops 304 are located on the same shelf. As such, example crops by shelf 610 includes a group of the image crops 214 selected by the grouping controller 414, where the group of the image crops 214 corresponds to the inputs 302 of FIG. 3.

The inputs 302 generated at the crops by shelf 610 are provided to an example classification 608. At the example classification block 608, the prediction generator 410 generates the query predictions 220 of FIG. 2 and neighbor predictions corresponding to each of the neighbor image crops 304. For example, at the classification 608, the prediction generator 410 provides the query image crop 216 and the neighbor image crops 304 as input to the product classification CNN model 218 of FIG. 2 to generate the query confidence levels 224 and the neighbor confidence levels 310 of FIG. 3, as well as the corresponding query product descriptions 222 and neighbor product descriptions. In some examples, the product classification CNN model 218 is generated, trained, and/or validated by the model trainer 404 prior to execution of the product classification CNN model 218. In the illustrated example of FIG. 6, the classification 608 outputs example shelf crop predictions 612, where the example shelf crop predictions 612 include the query predictions 220 and the neighbor predictions (e.g., the query confidence levels 224, the neighbor confidence levels 310, the query product descriptions 222, and the neighbor product descriptions) corresponding to the query image crop 216 and the neighbor image crops 304.

In the illustrated example of FIG. 6, at an example confidence recalibration 614, the confidence recalibrator 412 of FIG. 4 recalibrates one or more shelf crop confidence levels (e.g., the query confidence levels 224 and/or the neighbor confidence levels 310) from the shelf crop predictions 612. For example, at the confidence recalibration 614, the confidence recalibrator 412 recalibrates the query confidence levels 224 based on the shelf crop predictions 612 and the volume co-occurrence distribution graph 316 of FIGS. 3 and/or 4B. In such examples, the confidence recalibrator 412 recalibrates the query confidence levels 224 using Equations 1 and 2 described in connection with FIG. 4 above. In the illustrated example of FIG. 6, example recalibrated shelf crop confidence levels 616 (e.g., including the recalibrated query confidence levels 318 of FIG. 3) are an output of the confidence recalibration 614. In some examples, the process flow 600 can be executed by the classification controller 400 in response to a command from the user. In some examples, the classification controller 400 executes the process flow 600 in response to the input interface 402 receiving a new input image (e.g., the input image 206) for which product detection and/or product classification can be performed.

Figure 7:
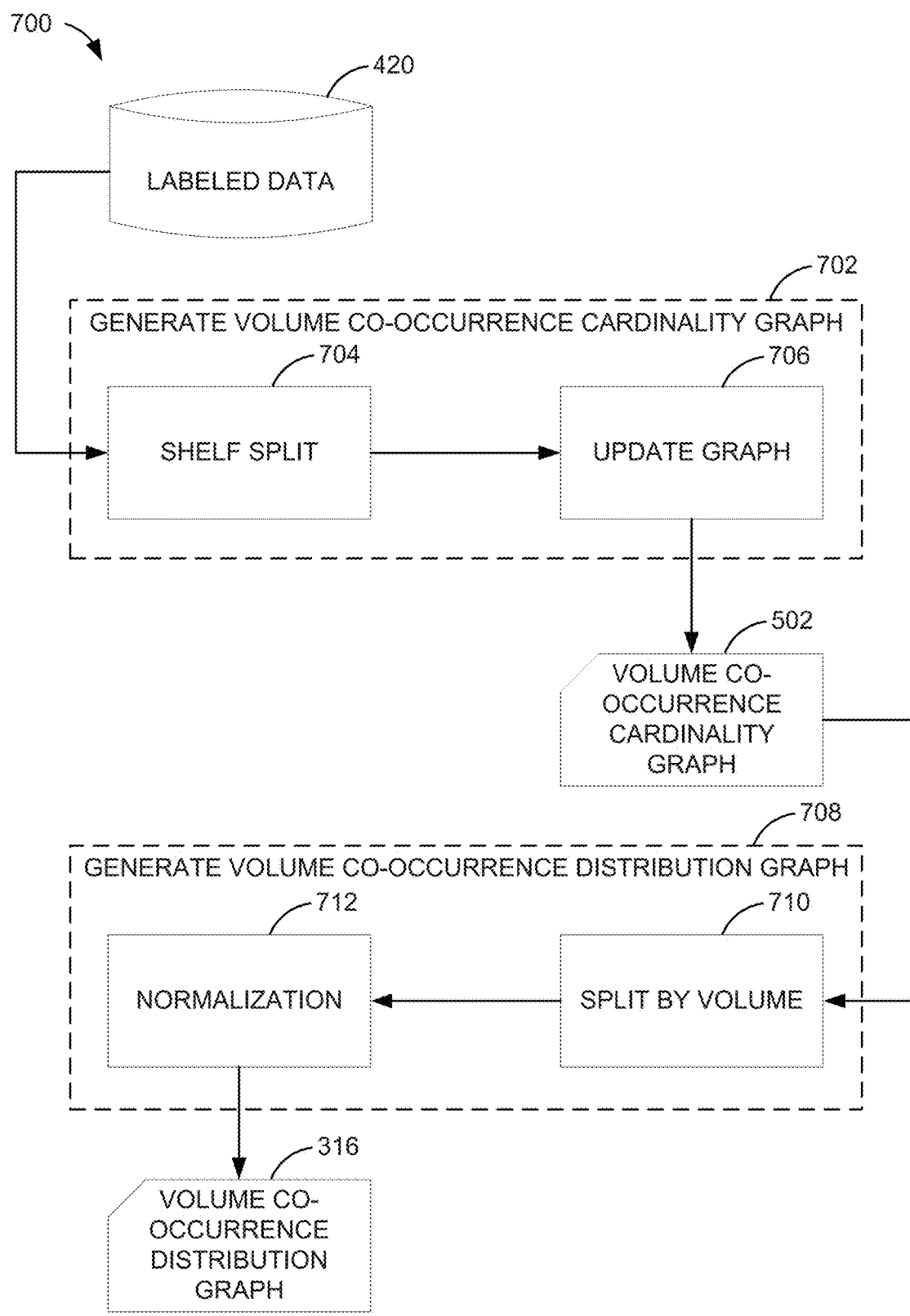
FIG. 7 is a block diagram of an example graph generation process flow that can be implemented in examples disclosed herein.

FIG. 7 is a block diagram of an example graph generation process flow 700 that can be implemented in examples disclosed herein. For example, the classification controller 400 of FIG. 4 can execute the graph generation process flow 700 to generate the cardinality graph 502 of FIG. 5A and/or the distribution graph 316 of FIGS. 3 and/or 5B. In the illustrated example of FIG. 7, the graph generation process flow 700 includes example volume co-occurrence cardinality graph generation (e.g., cardinality graph generation) 702 including an example shelf split 704 and an example update graph 706, and further includes example volume co-occurrence distribution graph generation (e.g., distribution graph generation) 708 including an example split by volume 710 and example normalization 712.

In the illustrated example of FIG. 7, the labeled data 420 of FIG. 4 is provided to (e.g., as an input to) the cardinality graph generation 702. For example, the labeled data 420 includes labeled images for which labels have been assigned by a human reviewer. For example, the labels can indicate product descriptions and volumes corresponding to products in the labeled images. Additionally, in some examples, the labels can indicate shelf locations of the corresponding products. At the shelf split 704, the grouping controller 414 of FIG. 4 splits the labeled data 420 into groups based on the shelf location of each of the labeled images. For example, at the shelf split 704, the grouping controller 414 can select a first group of the labeled images corresponding to the products on a first shelf, and a second group of the labeled images corresponding to the products on a second shelf. In some examples, one or more additional groups are generated corresponding to products located on one or more additional shelves. Additionally or alternatively, the grouping controller 414 selects the groups based on the shelf locations indicated by the labels of the labeled data 420.

In the illustrated example of FIG. 7, at the update graph 706, the first group and/or the second group from the labeled data 420 can be used to generate the cardinality graph 502. For example, at the update graph 706, the co-occurrence graph generator 406 of FIG. 4 determines the number of co-occurrences for each volume pair in the first shelf and/or in the second shelf based on the labeled data 420. In such examples, the co-occurrence graph generator 406 determines each value in the cardinality graph 502 based on the number of co-occurrences between a first volume corresponding to one of the columns 508 of FIG. 5A and a second volume corresponding to one of the rows 506 of FIG. 5A. In the illustrated example of FIG. 7, the cardinality graph 502 is an output of the update graph 706 and/or, more generally, of the cardinality graph generation 702.

In the illustrated example of FIG. 7, the cardinality graph 502 is provided to (e.g., provided to as an input) the distribution graph generation 708. For example, at the split by volume 710, the grouping controller 414 splits the cardinality graph 502 by volume. For example, the grouping controller 414 splits the cardinality graph 502 into the first column 508A corresponding to a first volume, the second column 508B corresponding to a second volume, and a third column 508C corresponding to a third volume. At the normalization 712, the co-occurrence graph generator 406 normalizes the cardinality graph 502 to generate the distribution graph 316 of FIGS. 3 and/or 5B. For example, the co-occurrence graph generator 406 determines a first sum based on values in the first column 508A of the cardinality graph 502, a second sum based on values in the second column 508B of the cardinality graph 502, and a third sum based on values in the third column 508C of the cardinality graph 502. Furthermore, at the normalization 712, the co-occurrence graph generator 406 divides each of the values in the first column 508A by the first sum, divides each of the values in the second column 508B by the second sum, and divides each of the values in the third column 508C by the third sum. In response to dividing the values of the cardinality graph 502 by the corresponding first sum, the second sum, or the third sum, the co-occurrence graph generator 406 generates the distribution graph 316. As such, the distribution graph 316 is an output of the normalization 712 and/or, more generally, of the distribution graph generation 708.

In some examples, the classification controller 400 executes the graph generation process flow 700 in response to the input interface 402 of FIG. 4 receiving the labeled data 420. In some examples, the classification controller 400 can execute the graph generation process flow 700 to update the cardinality graph 502 and/or the distribution graph 316 in response to new labeled data being received by the input interface 402.

Figure 8:
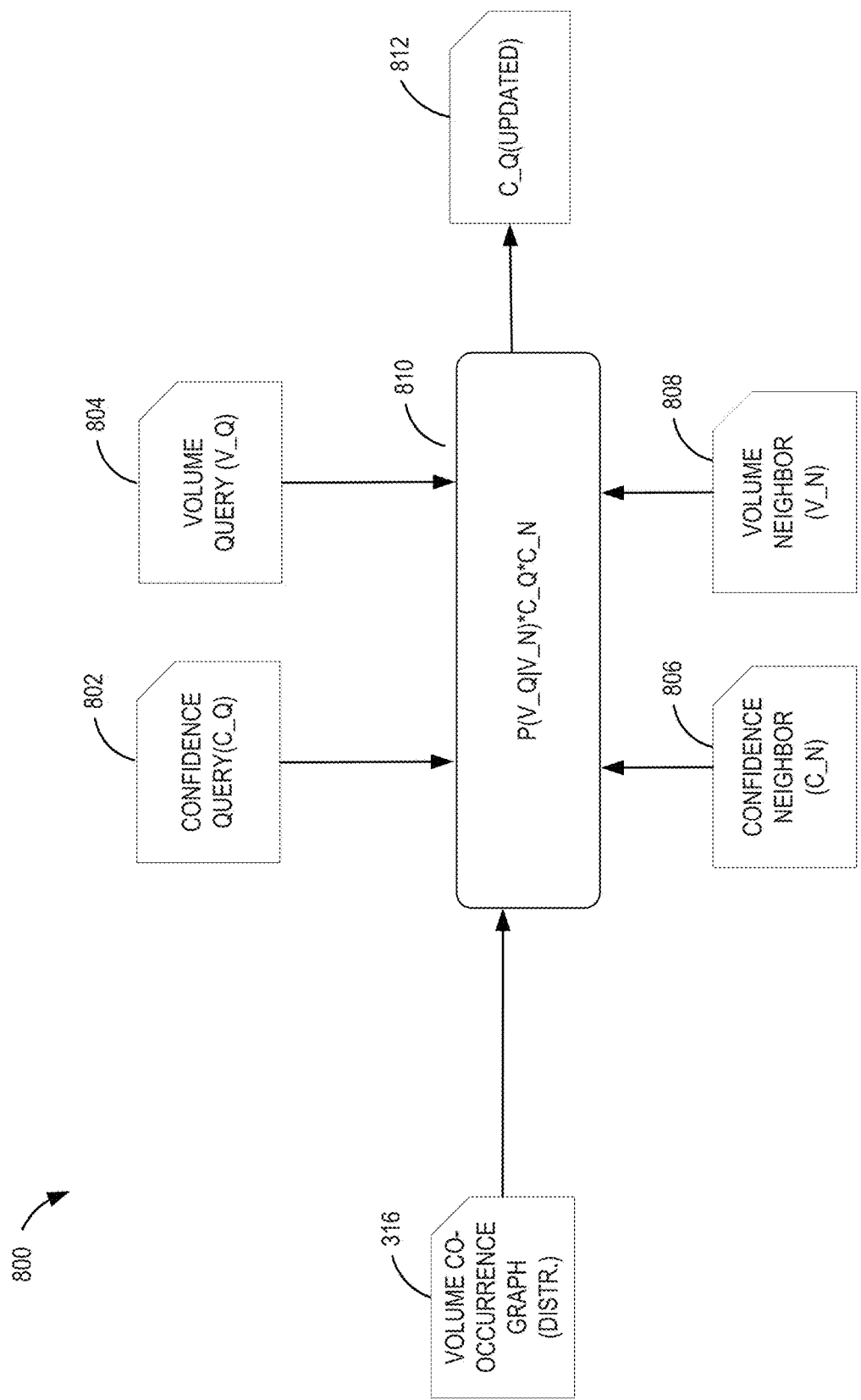
FIG. 8 is a block diagram of an example recalibration process flow executed to recalibrate confidence levels that can be implemented in examples disclosed herein.

FIG. 8 is a block diagram of an example recalibration process flow 800 executed by the classification controller 400 of FIG. 4 to recalibrate the query confidence levels 224 of FIGS. 2 and/or 3 that can be implemented in examples disclosed herein. In some examples, the recalibration process flow 800 is executed at the confidence recalibration 614 of FIG. 6. In the illustrated example of FIG. 8, the recalibration process flow 800 includes the distribution graph 316 of FIGS. 3, 5B, 6 and/or 7, an example query confidence (e.g., $C_q$) 802, an example query volume (e.g., $V_q$) 804, an example neighbor confidence (e.g., $C_n$) 806, and an example neighbor volume (e.g., $V_n$) 808. In the illustrated example of FIG. 8, the distribution graph 316, the query confidence 802, the query volume 804, the neighbor confidence 806, and the neighbor volume 808 are inputs to an example calculation 810, where an example updated query confidence 812 is generated at the calculation 810.

In the illustrated example of FIG. 8, the query confidence 802 and the query volume 804 correspond to an $i^{th}$ rank of the query predictions 220 of FIG. 2. For example, in response to the classification controller 400 recalibrating one of the query confidence levels 224 corresponding to a top rank (e.g., i=1), the query confidence 802 and the query volume 804 based on the first query prediction 220A are 0.6 and 0.5 L, respectively. In other examples, the query confidence 802 and the query volume 804 can correspond to a different rank of the query predictions 220 (e.g., a second rank, a third rank, etc.). For example, the rank corresponds to the one of the query confidence levels 224 being recalibrated. Furthermore, in the illustrated example of FIG. 8, the neighbor confidence 806 and the neighbor volume 808 also correspond to a top (e.g., i=1) prediction for a first one of the neighbor image crops 304 (e.g., the first neighbor image crop 304A). In some examples, the query confidence 802 is recalibrated based on only a top 1 prediction of the first neighbor image crop 304A. In other examples, the query confidence 802 can be recalibrated based on top n predictions of the first neighbor image crop 304A, where n can be between 1 and the total number of products (e.g., K) supported by the product classification CNN model 218 of FIG. 2.

In the illustrated example of FIG. 8, at the calculation 810, the confidence recalibrator 412 of FIG. 4 determines the conditional probability between the query volume 804 and the neighbor volume 808 (e.g., $p(V_q|V_n)$) based on the distribution graph 316. In one example, in response to the query volume 804 and the neighbor volume 808 both being 0.5 L, the confidence recalibrator 412 determines that the conditional probability is 0.83. Furthermore, at the calculation 810, the confidence recalibrator 412 determines a product of the conditional probability, the query confidence 802, and the neighbor confidence 806. For examples in which the query image crop 216 only has one neighbor (e.g., the first neighbor image crop 304A), the updated query confidence 812 corresponds to a logarithm of the product. In other examples, multiple products are determined corresponding to each of the neighbor image crops 304. In some such examples, at the calculation block 810, the confidence recalibrator 412 determines a first product for the first neighbor image crop 304A, a second product for the second neighbor image crop 304B, etc. In such examples, the confidence recalibrator 412 determines a sum of the multiple products, where the updated query confidence 812 corresponds to the sum.

While an example manner of implementing the classification controller 400 of FIG. 4 is illustrated in FIG. 4, one or more of the elements, processes and/or devices illustrated in FIG. 4 may be combined, divided, re-arranged, omitted, eliminated and/or implemented in any other way. Further, the example input interface 402, the example model trainer 404, the example co-occurrence graph generator 406, the example image crop detector 408, the example prediction generator 410, the example confidence recalibrator 412, the example grouping controller 414, the example report generator 416, the example database 418 and/or, more generally, the example classification controller 400 of FIG. 4 may be implemented by hardware, software, firmware and/or any combination of hardware, software and/or firmware. Thus, for example, any of the example input interface 402, the example model trainer 404, the example co-occurrence graph generator 406, the example image crop detector 408, the example prediction generator 410, the example confidence recalibrator 412, the example grouping controller 414, the example report generator 416, the example database 418 and/or, more generally, the example classification controller 400 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input interface 402, the example model trainer 404, the example co-occurrence graph generator 406, the example image crop detector 408, the example prediction generator 410, the example confidence recalibrator 412, the example grouping controller 414, the example report generator 416, and/or the example database 418 is/are hereby expressly defined to include a non-transitory computer readable storage device or storage disk such as a memory, a digital versatile disk (DVD), a compact disk (CD), a Blu-ray disk, etc. including the software and/or firmware. Further still, the example classification controller of FIG. 4 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
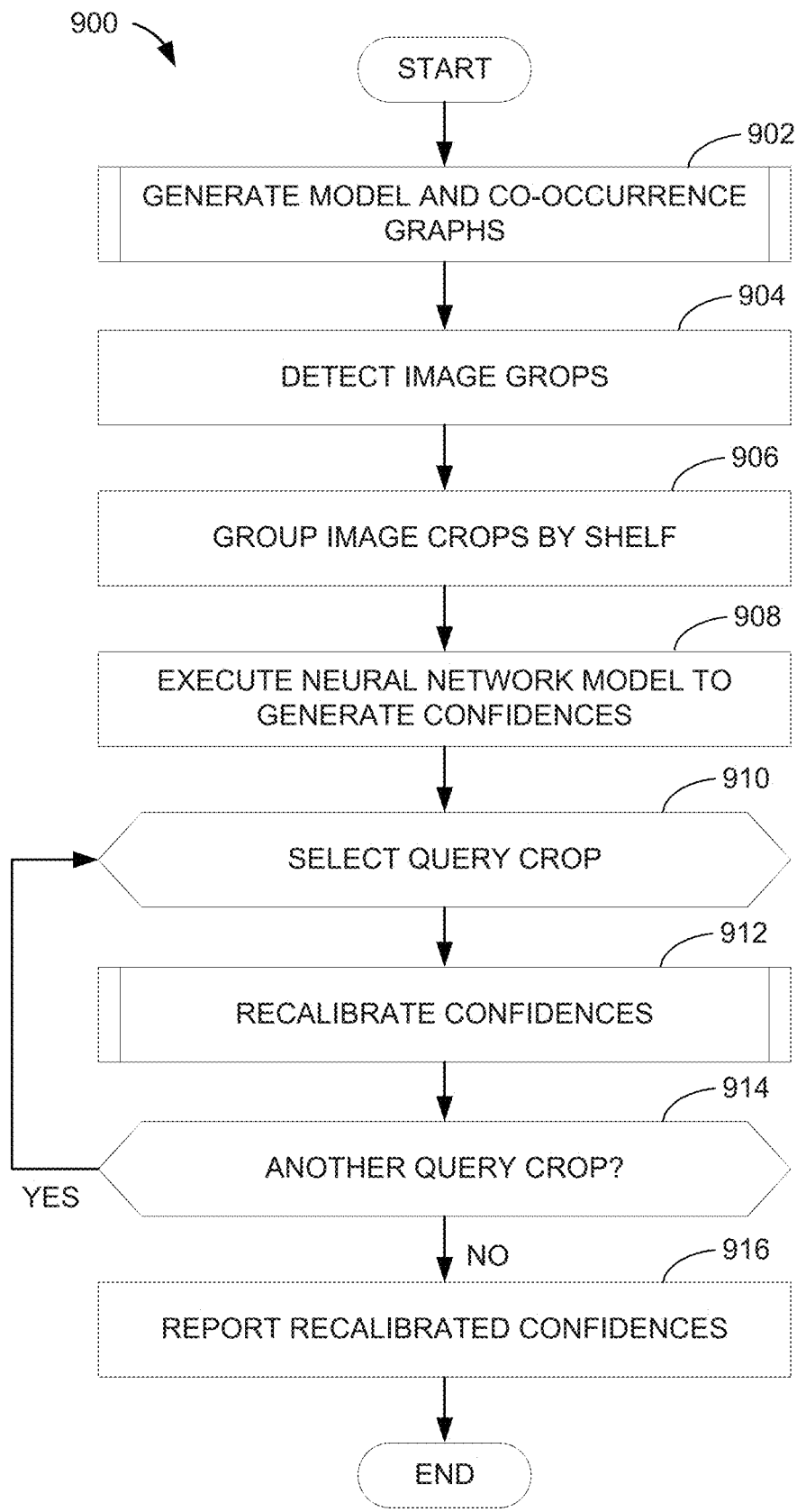
FIGS. 9-11 are flowcharts representative of machine readable instructions which may be executed to implement the example classification controller of FIG. 4.
Figure 10:
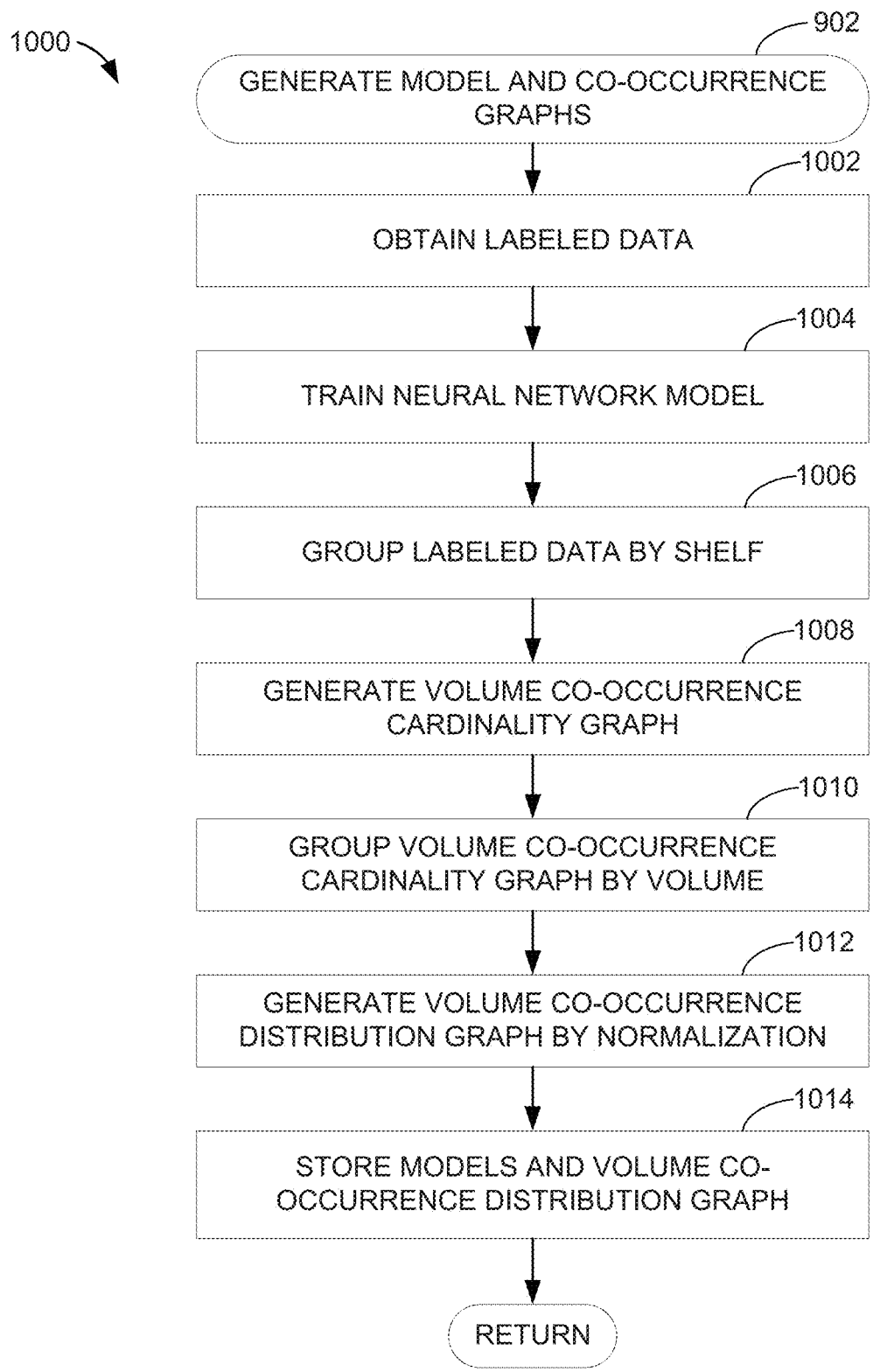

Flowcharts representative of example hardware logic, machine readable instructions, hardware implemented state machines, and/or any combination thereof for implementing the classification controller 400 of FIG. 4 are shown in FIGS. 9, 10, and/or 11. The machine readable instructions may be one or more executable programs or portion(s) of an executable program for execution by a computer processor and/or processor circuitry, such as the processor 1212 shown in the example processor platform 1200 discussed below in connection with FIG. 12. The programs may be embodied in software stored on a non-transitory computer readable storage medium such as a CD-ROM, a floppy disk, a hard drive, a DVD, a Blu-ray disk, or a memory associated with the processor 1212, but the entire programs and/or parts thereof could alternatively be executed by a device other than the processor 1212 and/or embodied in firmware or dedicated hardware. Further, although the example programs are described with reference to the flowcharts illustrated in FIGS. 9, 10, and/or 11, many other methods of implementing the example classification controller 400 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 9, 10, and/or 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 9 is a flowchart representative of machine readable instructions 900 which may be executed to implement examples disclosed herein. For example, the instructions 900 can be executed by the example classification controller 400 of FIG. 4 to generate and recalibrate confidence levels (e.g., the query confidence levels 224 of FIG. 2) for the query image crop 216 of FIG. 2. The instructions 900 of FIG. 9 begin as the classification controller 400 receives a command from a user (e.g., via the input interface 402 of FIG. 4) to generate and/or recalibrate the query confidence levels 224 for the input image 206 of FIG. 2.

At block 902, the example classification controller 400 generates one or more models and co-occurrence graphs. For example, the model trainer 404 of FIG. 4 generates the product detection CNN model 208 and the product classification CNN model 218 of FIG. 2, and the co-occurrence graph generator 406 of FIG. 4 generates the cardinality graph 502 of FIG. 5A and the distribution graph 316 of FIGS. 3 and/or 5B. Block 902 is described in greater detail below in connection with FIG. 10.

At block 904, the example classification controller 400 detects the image crops 214 of FIG. 2 from the input image 206. For example, the image crop detector 408 of FIG. 4 detects the output detections 210 by executing the product detection CNN model generated at block 902 with the input image 106, and crops the output detections 210 to generate the image crops 214. Additionally or alternatively, at block 902, the image crop detector 408 can reshape and/or resize the image crops 214.

At block 906, the example classification controller 400 groups the image crops 214 by shelf, for example. In this example, the grouping controller 414 of FIG. 4 selects a first group corresponding to first ones of the image crops 214 on a first shelf of the input image 206, and selects a second group corresponding to second ones of the image crops 214 on a second shelf of the input image 206. For example, the first group can include the query image crop 216 of FIG. 2 and the neighbor image crops 304 of FIG. 3. While the first and second shelves are described in this example, any other appropriate type of platform, support, spatial demarcation and/or organization/placement structure can be implemented instead.

At block 908, the example classification controller 400 executes a neural network model to generate predictions for the image crops 214. For example, the prediction generator 410 of FIG. 4 executes the product classification CNN model 218 using the query image crop 216 and the neighbor image crops 304 to generate the example shelf crop predictions 612 of FIG. 6 that correspond to the first shelf of the input image 206. In such examples, the example shelf crop predictions 612 include the query predictions 220 and neighbor predictions corresponding to the query image crop 216 and the neighbor image crops 304, respectively. In some examples, the query predictions 220 and the neighbor predictions include the query confidence levels 224, the neighbor confidence levels 310, the query product descriptions 222 of FIG. 2, and neighbor product descriptions. Additionally or alternatively, the prediction generator 410 can execute the product classification CNN model 218 to generate predictions corresponding to the image crops 214 in the second group corresponding to the second shelf of the input image 206.

At block 910, the example classification controller 400 selects a query crop from the image crops 214. In such examples, the query crop is one of the image crops 214 for which confidence levels (e.g., the query confidence levels 224) are to be recalibrated. For example, the confidence recalibrator 412 selects the query image crop 216 from the first group of the image crops 214 corresponding to the first shelf of the input image 206. In other examples, the prediction generator 410 can select a different query crop from among the first group or the second group of the image crops 214.

At block 912, the example classification controller 400 recalibrates confidences for the query crop. For example, the confidence recalibrator 412 recalibrates the query confidence levels 224 based on the shelf crop predictions 612 and the distribution graph 316 corresponding to the first group of the image crops 214. Block 912 is further described in detail in connection with FIG. 11 below.

At block 914, the example classification controller 400 determines whether another query crop is to be selected for recalibration. For example, in response to the confidence recalibrator 412 determining that confidence levels for another query crop from the image crops 214 are to be recalibrated (e.g., block 914 returns a result of YES), the process returns to block 910. Alternatively, in response to the confidence recalibrator 412 determining that the confidence levels for another query crop are not to be recalibrated and/or determining that the confidence levels for each of the image crops 214 have been recalibrated (e.g., block 914 returns a result of NO), the process proceeds to block 916.

At block 916, the example classification controller 400 reports recalibrated confidences. For example, the report generator 416 of FIG. 4 generates a report including the recalibrated query confidence levels 616 of FIG. 6, which correspond to the query confidence levels 224. In some examples, the report generator 416 sends the report to a user via a computer communicatively coupled to the classification controller 400. Additionally or alternatively, the report can include the shelf crop predictions 612 corresponding to the first shelf and/or to the second shelf of the input image 206. In some examples, the report generator 416 stores the report in the database 418 of FIG. 4. The process ends.

FIG. 10 is a flowchart representative of machine readable instructions 1000 which may be executed to implement examples disclosed herein. For example, the instructions 1000 can be executed by the example classification controller 400 of FIG. 4 to generate one or more models and co-occurrence graphs in accordance with block 902 of FIG. 9. For example, the instructions 1000 of FIG. 10 begin as the example classification controller 400 is to generate the product detection CNN model 208 of FIG. 2, the product classification CNN model 218 of FIG. 2, the distribution graph 316 of FIGS. 3 and/or 5B, and/or the cardinality graph 502 of FIG. 5A.

At block 1002, the example classification controller 400 obtains labeled image data. For example, the model trainer 404 and the co-occurrence graph generator 406 of FIG. 4 obtain the labeled data 420 from the database 418 of FIG. 4. In some examples, the labeled data 420 includes data that has been manually reviewed by a human reviewer. For example, the labeled data 420 can include labeled image crops manually reviewed by a human reviewer, where the labeled image crops include labels identifying the products and/or shelf location of the products in the labeled image crops.

At block 1004, the example classification controller 400 trains one or more neural network models. For example, the model trainer 404 of FIG. 4 trains the one or more neural network models using the labeled data 420 to generate the product detection CNN model 208 and the product classification CNN model 218. In some examples, the model trainer 404 trains the product detection CNN model 208 and the product classification CNN model 218 using a first portion of the labeled data 420, and validates the product detection CNN model 208 and the product classification CNN model 218 using a second portion of the labeled data 420.

At block 1006, the example classification controller 400 groups the labeled data 420 based on shelf location, for example. In this example, the grouping controller 414 of FIG. 4 groups the labeled image crops from the labeled data 420 into a first group corresponding to a first shelf and a second group corresponding to a second shelf. In some examples, the grouping controller 414 groups the labeled image crops based on the corresponding labels of the labeled image crops.

At block 1008, the example classification controller 400 generates a volume co-occurrence cardinality graph (e.g., the cardinality graph 502). For example, the co-occurrence graph generator 406 of FIG. 4 generates the cardinality graph 502 corresponding to the first group and the second group of the labeled image crops from the labeled data 420.

In such an example, the co-occurrence graph generator 406 determines the number of co-occurrence for each volume pair in the labeled data 420 to generate the cardinality graph 502.

At block 1010, the example classification controller 400 groups the volume co-occurrence cardinality graph 502 by volume. For example, the co-occurrence graph generator 406 identifies the first column 508A of the cardinality graph 502 corresponding to a first volume, the second column 508B of the cardinality graph 502 corresponding to a second volume, and the third column 508C of the cardinality graph 502 corresponding to a third volume.

At block 1012, the example classification controller 400 generates a volume co-occurrence distribution graph (e.g., the distribution graph 316) by normalizing the cardinality graph 502. For example, the co-occurrence graph generator 406 determines a first sum for values in the first column 508A, a second sum for values in the second column 508B, and a third sum for values in the third column 508C. In such an example, the co-occurrence graph generator 406 divides each of the values in the first column 508A by the first sum, divides each of the values in the second column 508B by the second sum, and divides each of the values in the third column 508C to normalize the cardinality graph 502. As such, the co-occurrence graph generator 406 generates the distribution graph 316 based on normalized values from the cardinality graph 502.

At block 1014, the example classification controller 400 stores the one or more neural network models and the distribution graph 316. For example, the model trainer 404 stores the product detection CNN model 208 and the product classification CNN model 218 in the database 418 of FIG. 4, and the co-occurrence graph generator 406 stores the cardinality graph 502 and the distribution graph 316 in the database 418. Additionally or alternatively, the model trainer 404 provides the product detection CNN model 208 to the image crop detector 408 and provides the product classification CNN model 218 to the prediction generator 410. In some examples, the co-occurrence graph generator 406 provides the distribution graph to the confidence recalibrator 412 of FIG. 4. The process returns to the instructions 900 of FIG. 9.

Figure 11:
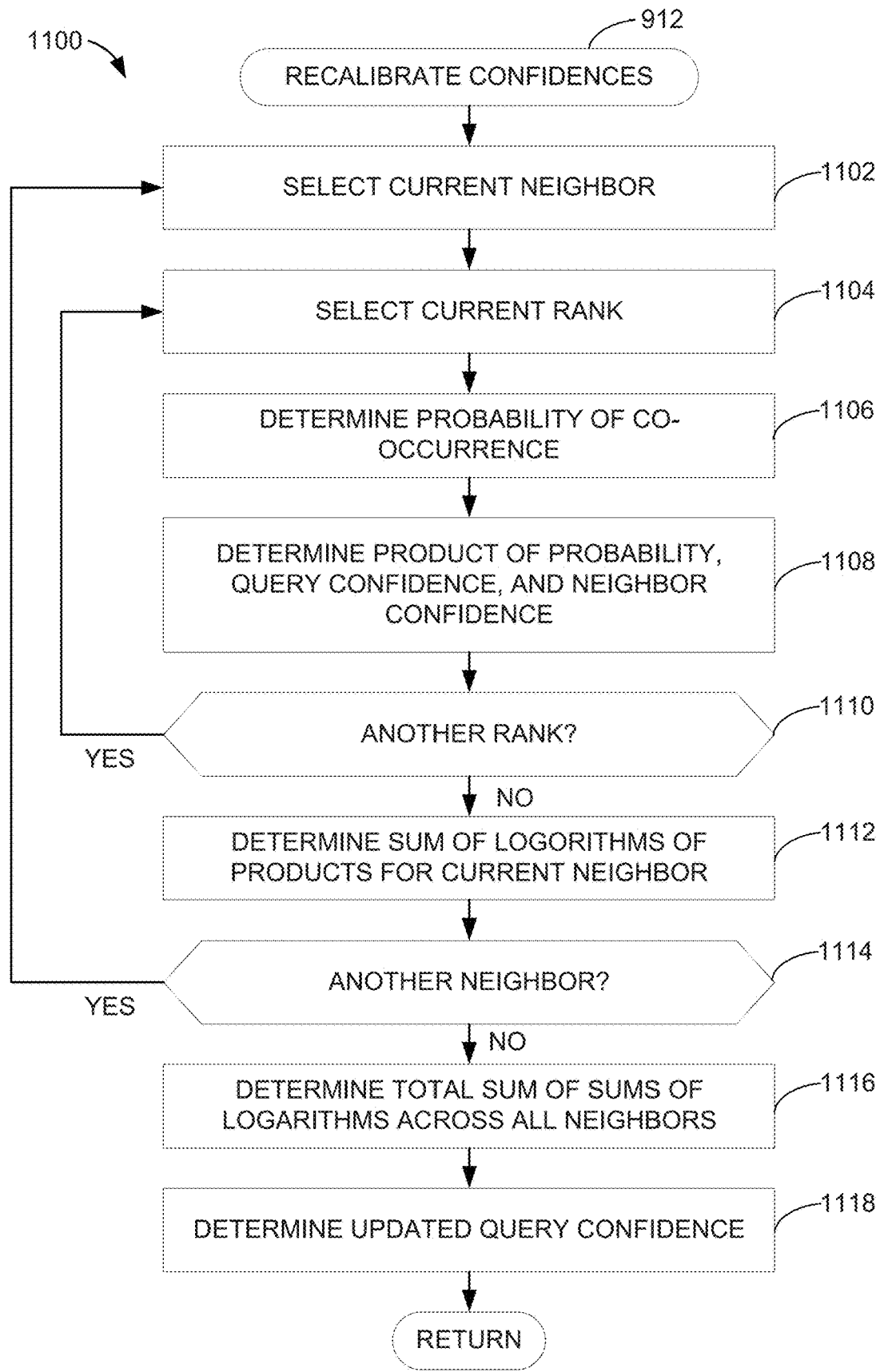

FIG. 11 is a flowchart representative of machine readable instructions 1100 which may be executed to implement examples disclosed herein. For example, the instructions 1100 can be executed by the example classification controller 400 of FIG. 4 to recalibrate confidences in accordance with block 912 of FIG. 9. For example, the instructions 1100 of FIG. 11 begin as the example classification controller 400 is to recalibrate a top query confidence (e.g., the first query confidence level 224A equal to 0.6) from the query confidence levels 224 of FIG. 2 corresponding to the query image crop 216 of FIG. 2. In other examples, the example classification controller 400 executes the instructions 1100 to configure a different one of the query confidence levels 224 (e.g., the second query confidence level 224B, the third query confidence level 224C, etc.).

At block 1102, the example classification controller 400 selects a current neighbor of the query image crop 216. For example, the confidence recalibrator 412 of FIG. 4 selects the current neighbor (e.g., corresponding to an index n) from the neighbor image crops 304 of FIG. 3. In some examples, the confidence recalibrator 412 of FIG. 4 selects a first neighbor (e.g., n=1) from the neighbor image crops 304 as the current neighbor.

At block 1104, the example classification controller 400 selects a current rank (e.g., j) of the neighbor confidence levels 310 of FIG. 3. For example, the confidence recalibrator 412 selects a first rank (e.g., j=1) corresponding to a first position of the neighbor confidence levels 310 for the current neighbor.

At block 1106, the example classification controller 400 determines a probability of co-occurrence. For example, the confidence recalibrator 412 determines the probability of co-occurrence (e.g., $p(V_q|V_n)$) between a query volume and a current neighbor volume based on the distribution graph 316 of FIGS. 3 and/or 5B. In such an example, the query volume (e.g., $V_q$) is determined based on the first query prediction 220A corresponding to the first query confidence level 224A (e.g., 0.5 L), and the current neighbor volume (e.g., $V_n$) is based on a first neighbor prediction corresponding to the selected rank j and the current neighbor n. In some examples, the confidence recalibrator 412 determines the probability of co-occurrence $p(V_q|V_n)$ from a column of the distribution graph 316. corresponding to the query volume and a row of the distribution graph 316 corresponding to the neighbor volume.

At block 1108, the example classification controller 400 determines a product of the probability of co-occurrence, the first query confidence level 224A, and the one of the neighbor confidence levels 310 corresponding to the current rank. For example, the confidence recalibrator 412 determines the product by multiplying the probability of co-occurrence (e.g., $p(V_q|V_n)$) by the first query confidence level 224A (e.g., $C_q$) and a first neighbor confidence level (e.g., $C_n$) from the neighbor confidence levels 310 corresponding to the current rank j and the current neighbor n.

At block 1110, the example classification controller 400 determines whether another rank is to be selected as the current rank j. For example, in response to the confidence recalibrator 412 determining that another rank is to be selected (e.g., block 1110 returns a result of YES), the process returns to block 1104 where the confidence recalibrator 412 selects another rank (e.g., a second rank j=2) to determine a second product for the current neighbor n. Alternatively, in response to the confidence recalibrator 412 determining that another rank is not to be selected (e.g., block 1110 returns a result of NO), the process proceeds to block 1112. For example, the confidence recalibrator 412 can be configured to recalibrate the first query confidence level 224A based only on the top rank (e.g., j=1) of the neighbor confidence levels 310.

At block 1112, the example classification controller 400 determines a sum of logarithms of the products for the current neighbor n. For example, the confidence recalibrator 412 determines a first logarithm of the first product corresponding to the first rank (e.g., j=1) and a second logarithm of the second product corresponding to the second rank (e.g., j=2), then determines a sum of the first logarithm and the second logarithm. In other examples, the confidence recalibrator 412 determines the sum based on logarithms of products corresponding to each rank j from 1 to K, where K is a total number of the neighbor confidence levels 310 corresponding to the current neighbor n. In some examples in which only the first rank (e.g., j=1) is considered, the confidence recalibrator 412 determines the logarithm of the product generated at block 1108.

At block 1114, the example classification controller 400 determines whether another neighbor is to be selected as the current neighbor n. For example, in response to the confidence recalibrator 412 determining that another neighbor is to be selected (e.g., block 1114 returns a result of YES), the process returns to block 1102 where the confidence recalibrator 412 selects another neighbor (e.g., a second neighbor n=2) to determine a second sum of logarithms. Alternatively, in response to the confidence recalibrator 412 determining that another neighbor is not to be selected (e.g., block 1114 returns a result of NO), the process proceeds to block 1116. For example, the confidence recalibrator 412 determines that another neighbor is not to be selected in response to determining a sum of logarithms corresponding to each of the neighbor image crops 304 from n=1 to n=N, where N is the total number of the neighbor image crops 304.

At block 1116, the example classification controller 400 determines a total sum of the sums of logarithms for the neighbor image crops 304. For example, the confidence recalibrator 412 determines the total sum based on the sum of logarithms for each of the neighbor image crops 304 (e.g., the first neighbor n=1, the second neighbor n=2, etc.) from n=1 to n=N.

At block 1118, the example classification controller 400 determines an updated first query confidence level corresponding to the first query confidence level 224A. For example, the confidence recalibrator 412 determines that the updated first query confidence level corresponds to the total sum determined at block 1116 for the first query confidence level 224A. In some examples, the report generator 416 of FIG. 4 outputs a report including the recalibrated query confidence levels 318 of FIG. 3, where the recalibrated query confidence levels 318 include the updated first query confidence level. The process ends. In some examples, the process of FIG. 11 can be executed for each of the query confidence levels 224 corresponding to the query image crop 216. In some examples, the process of FIG. 11 can be executed for a number (e.g., 10) of the highest confidence levels 224.

Figure 12:
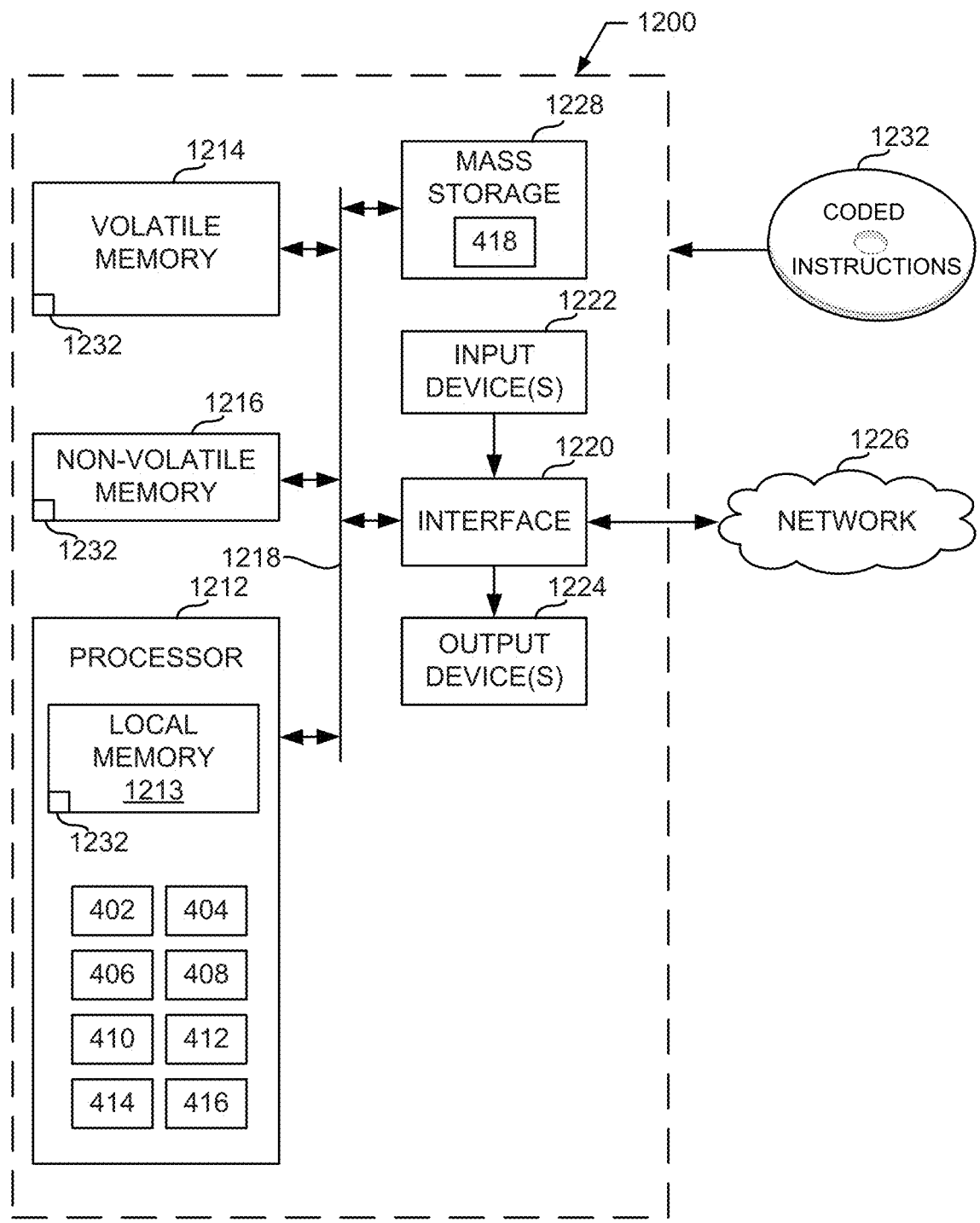
FIG. 12 is a block diagram of an example processing platform structured to execute the instructions of FIGS. 9, 10, and/or 11 to implement the example classification controller of FIG. 4.

FIG. 12 is a block diagram of an example processor platform 1200 structured to execute the instructions of FIGS. 9, 10, and/or 11 to implement the classification controller 400 of FIG. 4. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example input interface 402, the example model trainer 404, the example co-occurrence graph generator 406, the example image crop detector 408, the example prediction generator 410, the example confidence recalibrator 412, the example grouping controller 414, and the example report generator 416.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 9, 10, and/or 11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that classify products from images based on contextual information. The disclosed methods, apparatus and articles of manufacture improve the efficiency of using a computing device by recalibrating confidence levels corresponding to image classifications generated by the computing device, the recalibrated confidence levels to improve accuracy of the image classifications. The disclosed methods, apparatus and articles of manufacture are accordingly directed to one or more improvement(s) in the functioning of a computer.

Example 1 includes an apparatus to classify an image. The example apparatus of Example 1 includes an image crop detector to detect a first image crop from the image, the first image crop corresponding to a first object, a grouping controller to select a second image crop corresponding to a second object proximate a location of the first object, a prediction generator to, in response to executing a trained model, determine (a) a label corresponding to the first object and (b) a confidence level associated with the label, and a confidence recalibrator to recalibrate the confidence level by calculating a probability of the first object having a first attribute based on the second object having a second attribute, the second attribute identified based on the second image crop, the confidence level recalibrated to increase an accuracy of the image classification.

Example 2 includes the apparatus of Example 1, where the label indicates a product type of the first object and the first attribute of the first object.

Example 3 includes the apparatus of Example 1, where the confidence recalibrator calculates the probability based on a co-occurrence distribution graph.

Example 4 includes the apparatus of Example 3, and further includes a co-occurrence graph generator to generate a co-occurrence cardinality graph based on labeled data and generate the co-occurrence distribution graph by normalizing the co-occurrence cardinality graph.

Example 5 includes the apparatus of Example 1, where the trained model is a trained convolutional neural network model.

Example 6 includes the apparatus of Example 1, where the label is a first label, the confidence level is a first confidence level, the prediction generator to generate a second label corresponding to the second object and a second confidence level associated with the second label, and the confidence recalibrator to recalibrate the first confidence level further based on the second confidence level.

Example 7 includes the apparatus of Example 1, where the grouping controller selects the second image crop in response to determining that the first object and the second object are positioned on a same shelf.

Example 8 includes a method for classifying an image. The example method of Example 8 includes detecting, by executing instructions with at least one processor, a first image crop from the image, the first image crop corresponding to a first object, selecting, by executing instructions with the at least one processor, a second image crop corresponding to a second object proximate a location of the first object, determining, by executing instructions with the at least one processor, (a) a label corresponding to the first object and (b) a confidence level associated with the label based on a trained model, and recalibrating, by executing instructions with the at least one processor, the confidence level by calculating a probability of the first object having a first attribute based on the second object having a second attribute, the second attribute identified based on the second image crop, the confidence level recalibrated to increase an accuracy of the image classification.

Example 9 includes the method of Example 8, where the label indicates a product type of the first object and the first attribute of the first object.

Example 10 includes the method of Example 8, and further includes determining, by executing instructions with the at least one processor, the probability based on a co-occurrence distribution graph.

Example 11 includes the method of Example 10, and further includes generating, by executing instructions with the at least one processor, a co-occurrence cardinality graph based on labeled data and generating, by executing instructions with the at least one processor, the co-occurrence distribution graph by normalizing the co-occurrence cardinality graph.

Example 12 includes the method of Example 8, where the trained model is a trained convolutional neural network model.

Example 13 includes the method of Example 8, where the label is a first label, the confidence level is a first confidence level, and further including generating, by executing instructions with the at least one processor, a second label corresponding to the second object and a second confidence level associated with the second label, and recalibrating, by executing instructions with the at least one processor, the first confidence level further based on the second confidence level.

Example 14 includes the method of Example 8, where the selecting the second image crop includes determining that the first object and the second object are positioned on a same shelf.

Example 15 includes a non-transitory computer readable medium including instructions which, when executed, cause at least one processor to detect a first image crop from an image, the first image crop corresponding to a first object, select a second image crop corresponding to a second object proximate a location of the first object, determine, in response to executing a trained model, (a) a label corresponding to the first object and (b) a confidence level associated with the label, and recalibrate the confidence level based on calculating a probability of the first object having a first attribute based on the second object having a second attribute, the second attribute identified based on the second image crop, the confidence level recalibrated to increase an accuracy of a classification of the image.

Example 16 includes the non-transitory computer readable medium of Example 15, where the label indicates a product type of the first object and the first attribute of the first object.

Example 17 includes the non-transitory computer readable medium of Example 15, where the instructions, when executed, further cause the at least one processor to calculate the probability based on a co-occurrence distribution graph.

Example 18 includes the non-transitory computer readable medium of Example 17, where the instructions, when executed, further cause the at least one processor to generate a co-occurrence cardinality graph based on labeled data and generate the co-occurrence distribution graph by normalizing the co-occurrence cardinality graph.

Example 19 includes the non-transitory computer readable medium of Example 15, where the trained model is a trained convolutional neural network model.

Example 20 includes the non-transitory computer readable medium of Example 15, where the label is a first label, the confidence level is a first confidence level, and where the instructions, when executed, further cause the at least one processor to generate a second label corresponding to the second object and a second confidence level associated with the second label, and recalibrate the first confidence level further based on the second confidence level.

Example 21 includes the non-transitory computer readable medium of Example 20, where the instructions, when executed, further cause the at least one processor to select the second image crop in response to determining that the first object and the second object are positioned on a same shelf.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to classify an image, the apparatus comprising:
   an image crop detector to detect a first image crop from the image, the first image crop corresponding to a first object;
   a grouping controller to select a second image crop corresponding to a second object proximate a location of the first object;
   a prediction generator to, in response to executing a trained model, determine (a) a label corresponding to the first object and (b) a confidence level associated with the label; and
   a confidence recalibrator to recalibrate the confidence level by calculating a probability of the first object having a first attribute based on the second object having a second attribute, the second attribute identified based on the second image crop, the confidence level recalibrated to increase an accuracy of the image classification.

2. The apparatus of claim 1, wherein the label indicates a product type of the first object and the first attribute of the first object.

3. The apparatus of claim 1, wherein the confidence recalibrator calculates the probability based on a co-occurrence distribution graph.

4. The apparatus of claim 3, further including a co-occurrence graph generator to generate a co-occurrence cardinality graph based on labeled data and generate the co-occurrence distribution graph by normalizing the co-occurrence cardinality graph.

5. The apparatus of claim 1, wherein the trained model is a trained convolutional neural network model.

6. The apparatus of claim 1, wherein the label is a first label, the confidence level is a first confidence level, the prediction generator to generate a second label corresponding to the second object and a second confidence level associated with the second label, and the confidence recalibrator to recalibrate the first confidence level further based on the second confidence level.

7. The apparatus of claim 1, wherein the grouping controller selects the second image crop in response to determining that the first object and the second object are positioned on a same shelf.

8. A method for classifying an image, the method comprising:
   detecting, by executing instructions with at least one processor, a first image crop from the image, the first image crop corresponding to a first object;
   selecting, by executing instructions with the at least one processor, a second image crop corresponding to a second object proximate a location of the first object;
   determining, by executing instructions with the at least one processor, (a) a label corresponding to the first object and (b) a confidence level associated with the label based on a trained model; and
   recalibrating, by executing instructions with the at least one processor, the confidence level by calculating a probability of the first object having a first attribute based on the second object having a second attribute, the second attribute identified based on the second image crop, the confidence level recalibrated to increase an accuracy of the image classification.

9. The method of claim 8, wherein the label indicates a product type of the first object and the first attribute of the first object.

10. The method of claim 8, further including determining, by executing instructions with the at least one processor, the probability based on a co-occurrence distribution graph.

11. The method of claim 10, further including generating, by executing instructions with the at least one processor, a co-occurrence cardinality graph based on labeled data and generating, by executing instructions with the at least one processor, the co-occurrence distribution graph by normalizing the co-occurrence cardinality graph.

12. The method of claim 8, wherein the trained model is a trained convolutional neural network model.

13. The method of claim 8, wherein the label is a first label, the confidence level is a first confidence level, and further including generating, by executing instructions with the at least one processor, a second label corresponding to the second object and a second confidence level associated with the second label, and recalibrating, by executing instructions with the at least one processor, the first confidence level further based on the second confidence level.

14. The method of claim 8, wherein the selecting the second image crop includes determining that the first object and the second object are positioned on a same shelf.

15. A non-transitory computer readable medium comprising instructions which, when executed, cause at least one processor to:
   detect a first image crop from an image, the first image crop corresponding to a first object;
   select a second image crop corresponding to a second object proximate a location of the first object;
   determine, in response to executing a trained model, (a) a label corresponding to the first object and (b) a confidence level associated with the label; and
   recalibrate the confidence level based on calculating a probability of the first object having a first attribute based on the second object having a second attribute, the second attribute identified based on the second image crop, the confidence level recalibrated to increase an accuracy of a classification of the image.

16. The non-transitory computer readable medium of claim 15, wherein the label indicates a product type of the first object and the first attribute of the first object.

17. The non-transitory computer readable medium of claim 15, wherein the instructions, when executed, further cause the at least one processor to calculate the probability based on a co-occurrence distribution graph.

18. The non-transitory computer readable medium of claim 17, wherein the instructions, when executed, further cause the at least one processor to generate a co-occurrence cardinality graph based on labeled data and generate the co-occurrence distribution graph by normalizing the co-occurrence cardinality graph.

19. The non-transitory computer readable medium of claim 15, wherein the trained model is a trained convolutional neural network model.

20. The non-transitory computer readable medium of claim 15, wherein the label is a first label, the confidence level is a first confidence level, and wherein the instructions, when executed, further cause the at least one processor to generate a second label corresponding to the second object and a second confidence level associated with the second label, and recalibrate the first confidence level further based on the second confidence level.

21. The non-transitory computer readable medium of claim 20, wherein the instructions, when executed, further cause the at least one processor to select the second image crop in response to determining that the first object and the second object are positioned on a same shelf.

\* \* \* \* \*